INVENTOR
Morgan G. Huntington
BY Sughrue & Rothwell
ATTORNEYS

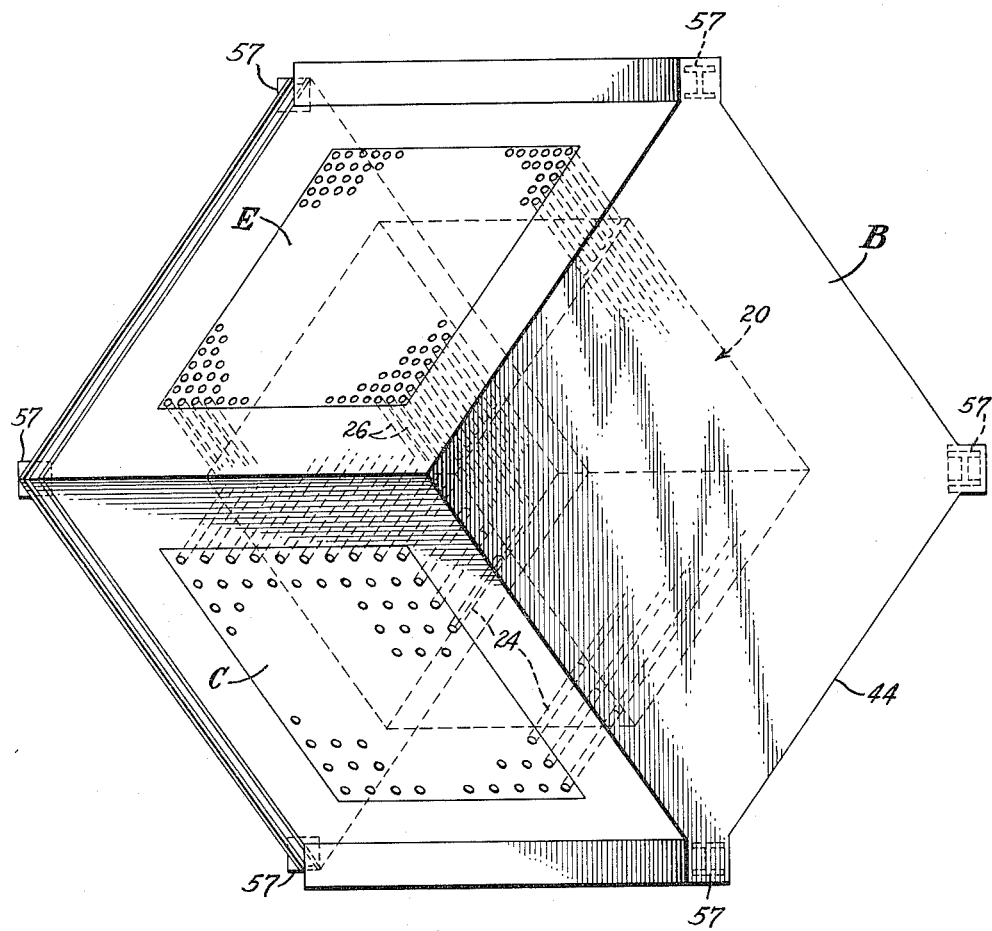

Oct. 5, 1965   M. G. HUNTINGTON   3,210,253
SELF-LIMITING RADIANT NUCLEAR BOILER AND SUPERHEATER
Filed Nov. 14, 1963   15 Sheets-Sheet 3
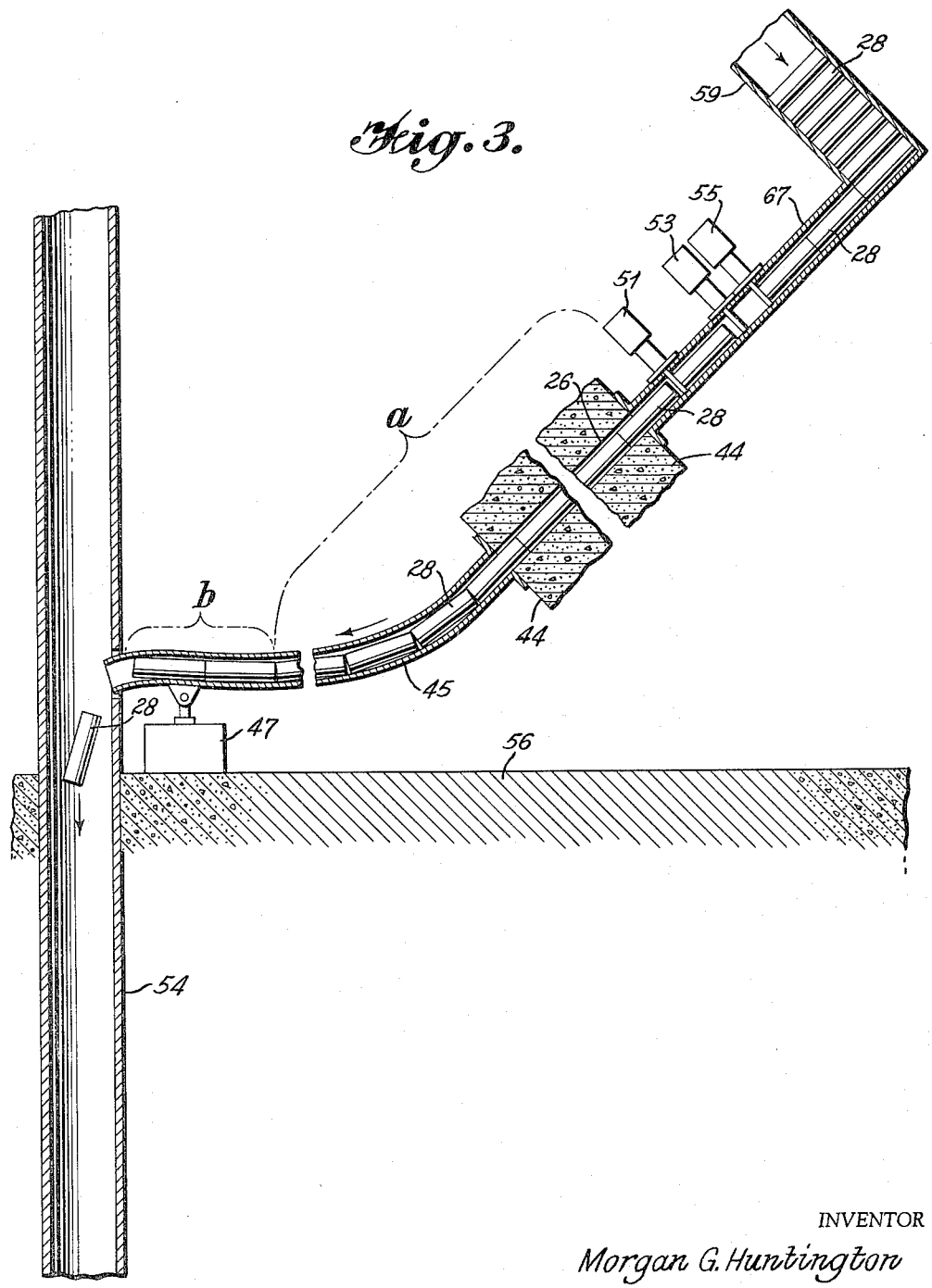
INVENTOR
Morgan G. Huntington
BY Sughrue & Rothwell
ATTORNEYS

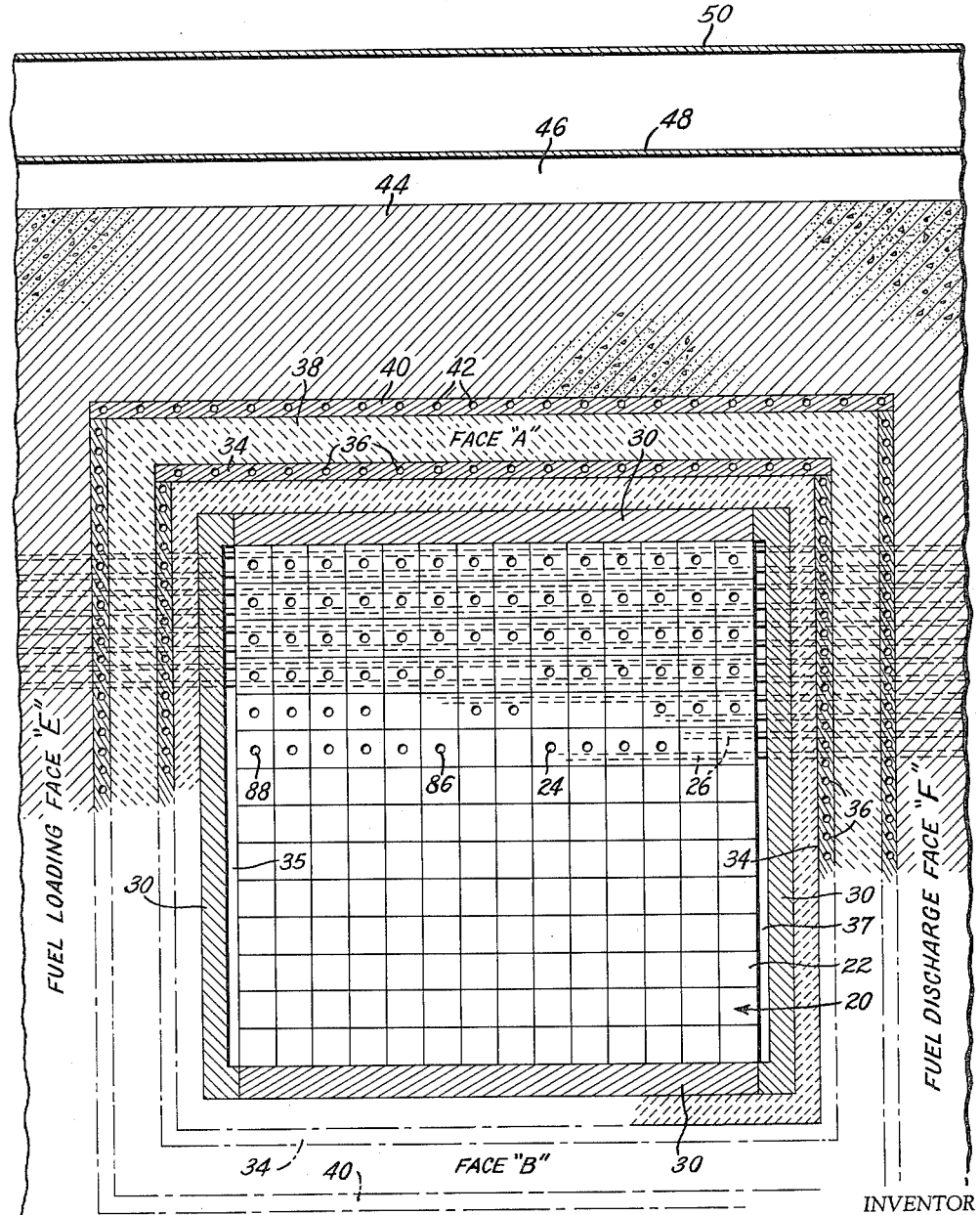

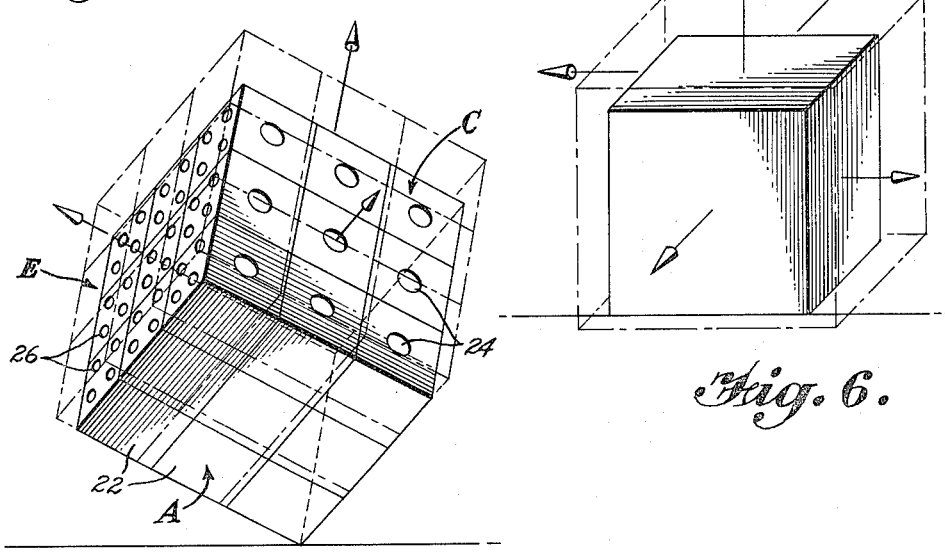
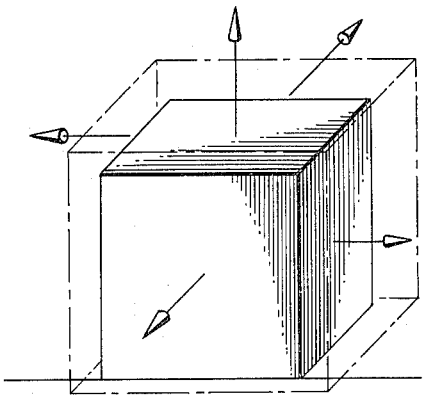
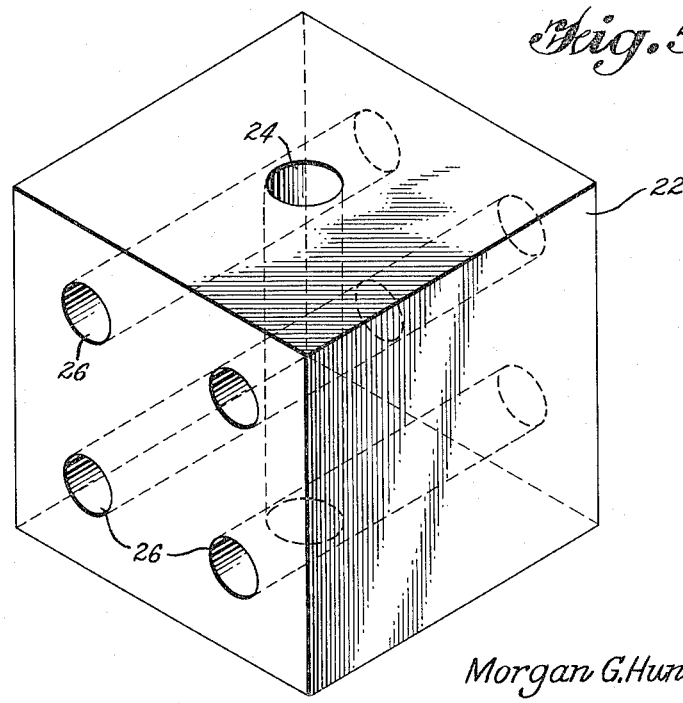

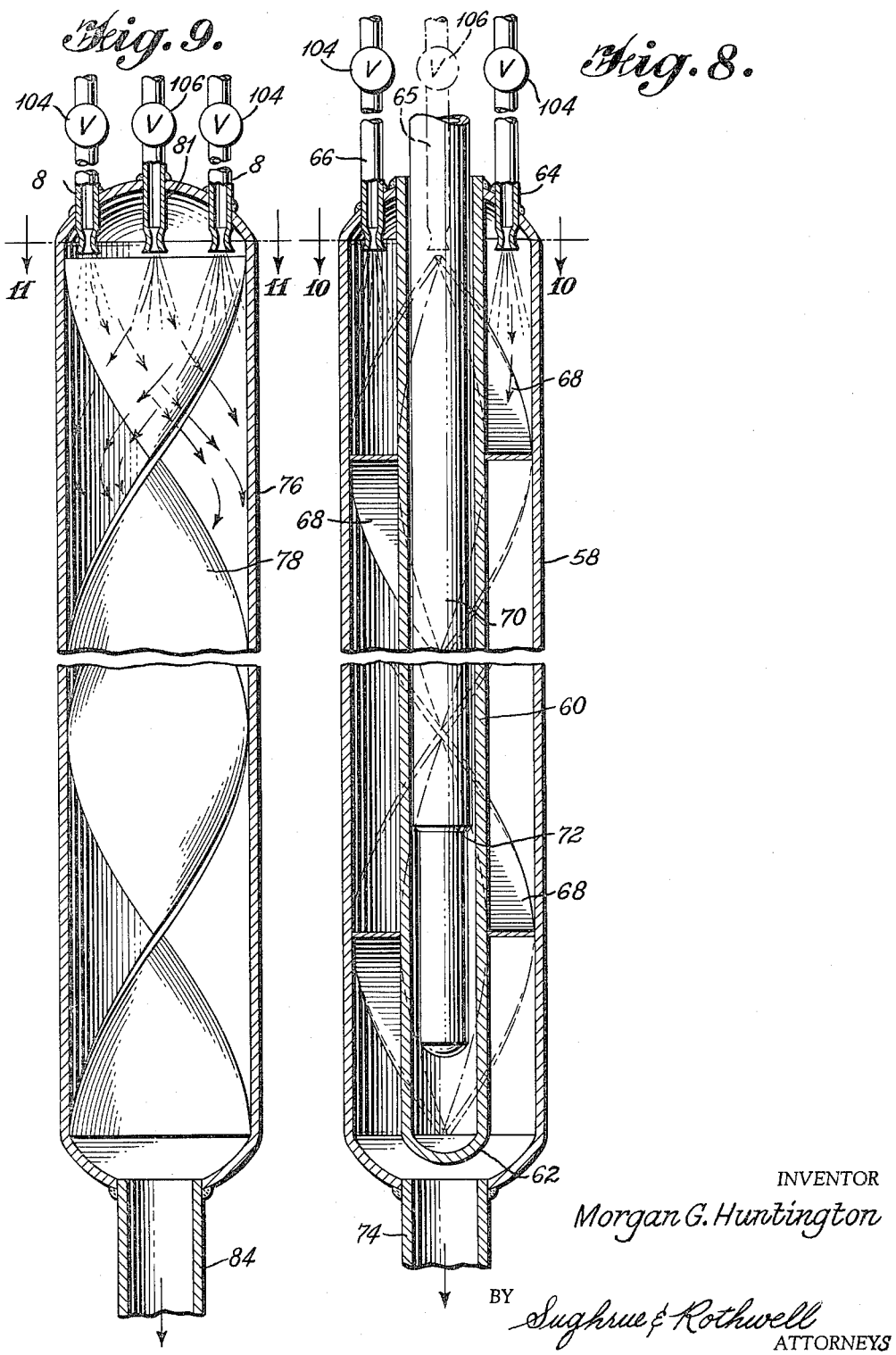

Oct. 5, 1965    M. G. HUNTINGTON    3,210,253
SELF-LIMITING RADIANT NUCLEAR BOILER AND SUPERHEATER
Filed Nov. 14, 1963    15 Sheets-Sheet 7
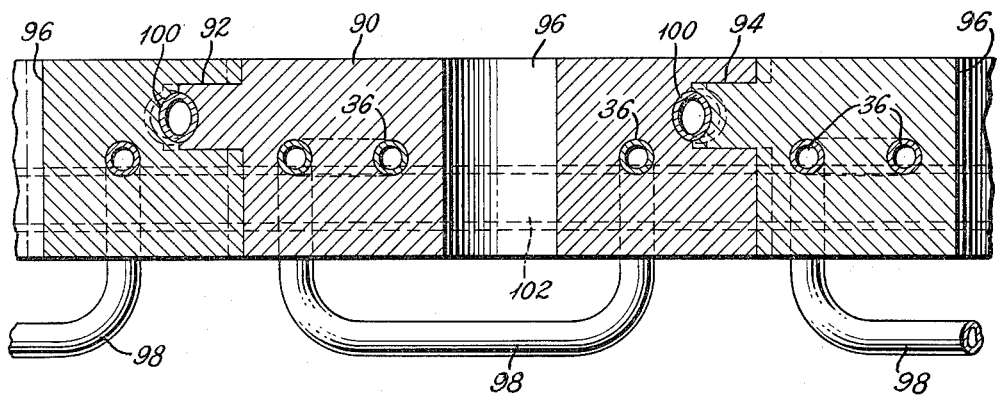
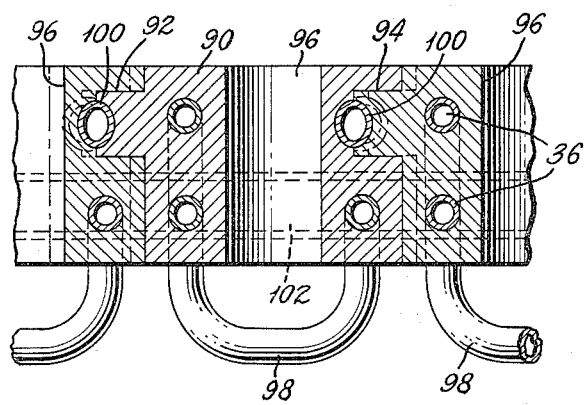
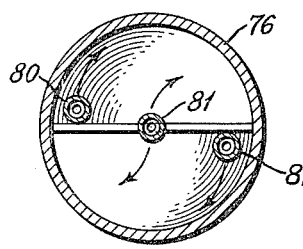
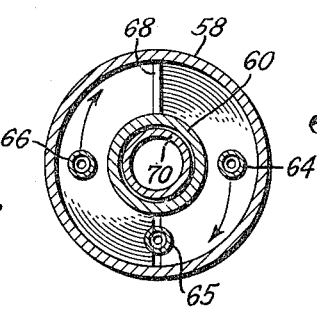
INVENTOR
Morgan G. Huntington
BY Sughrue & Rothwell
ATTORNEYS

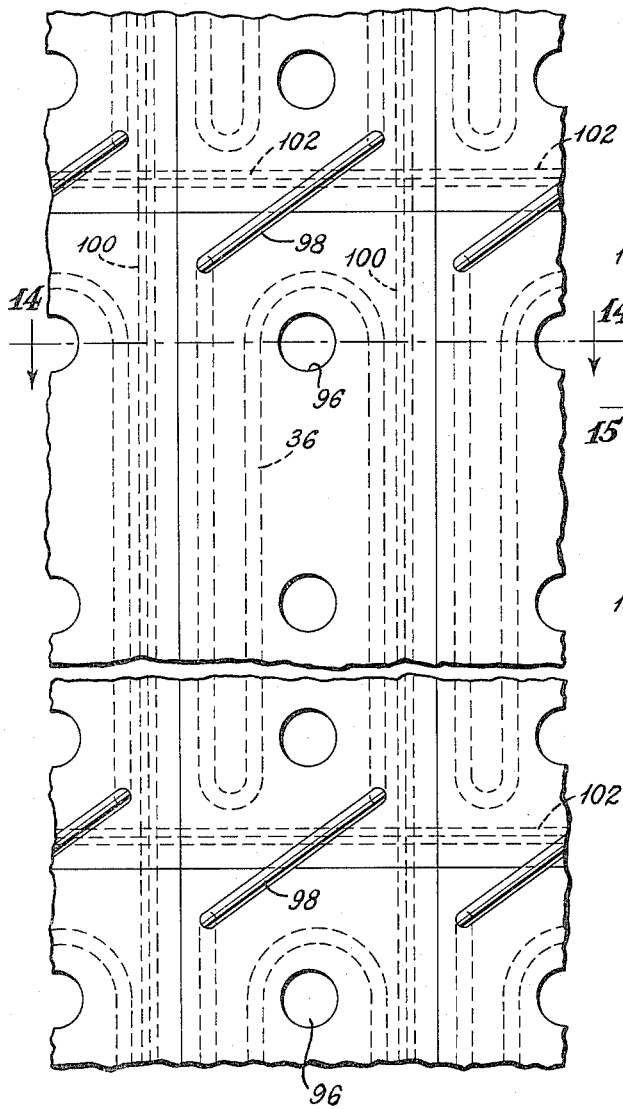
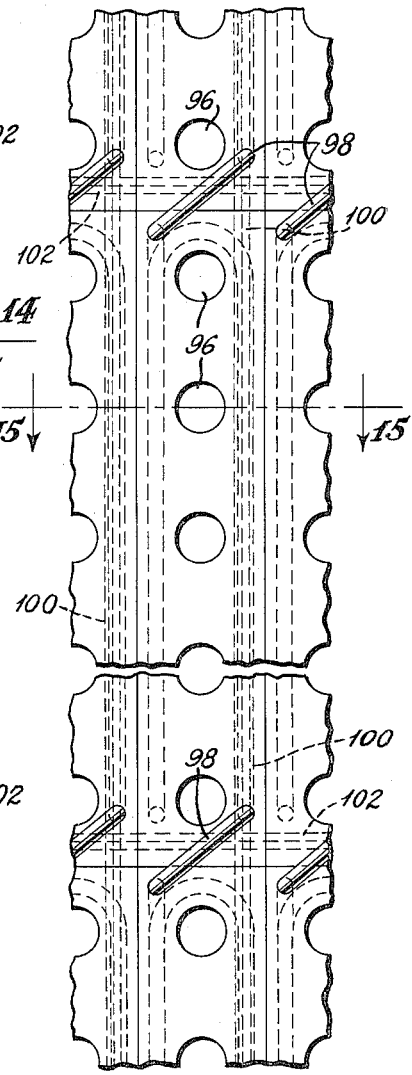

INVENTOR
Morgan G. Huntington
BY Sughrue & Rothwell
ATTORNEYS

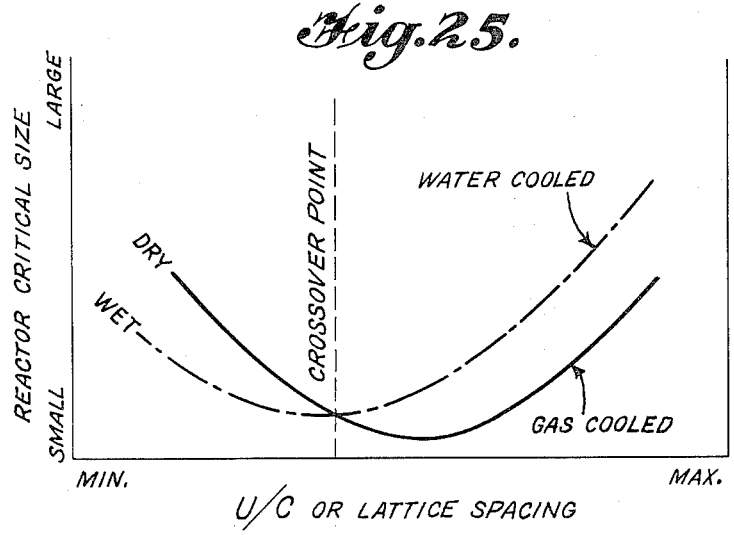
Fig. 25.
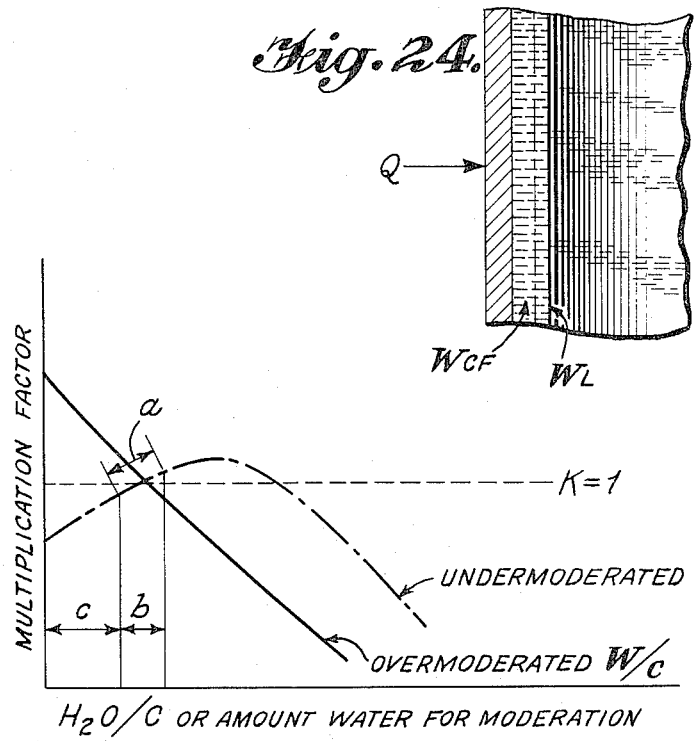
Fig. 24.
Fig. 27.

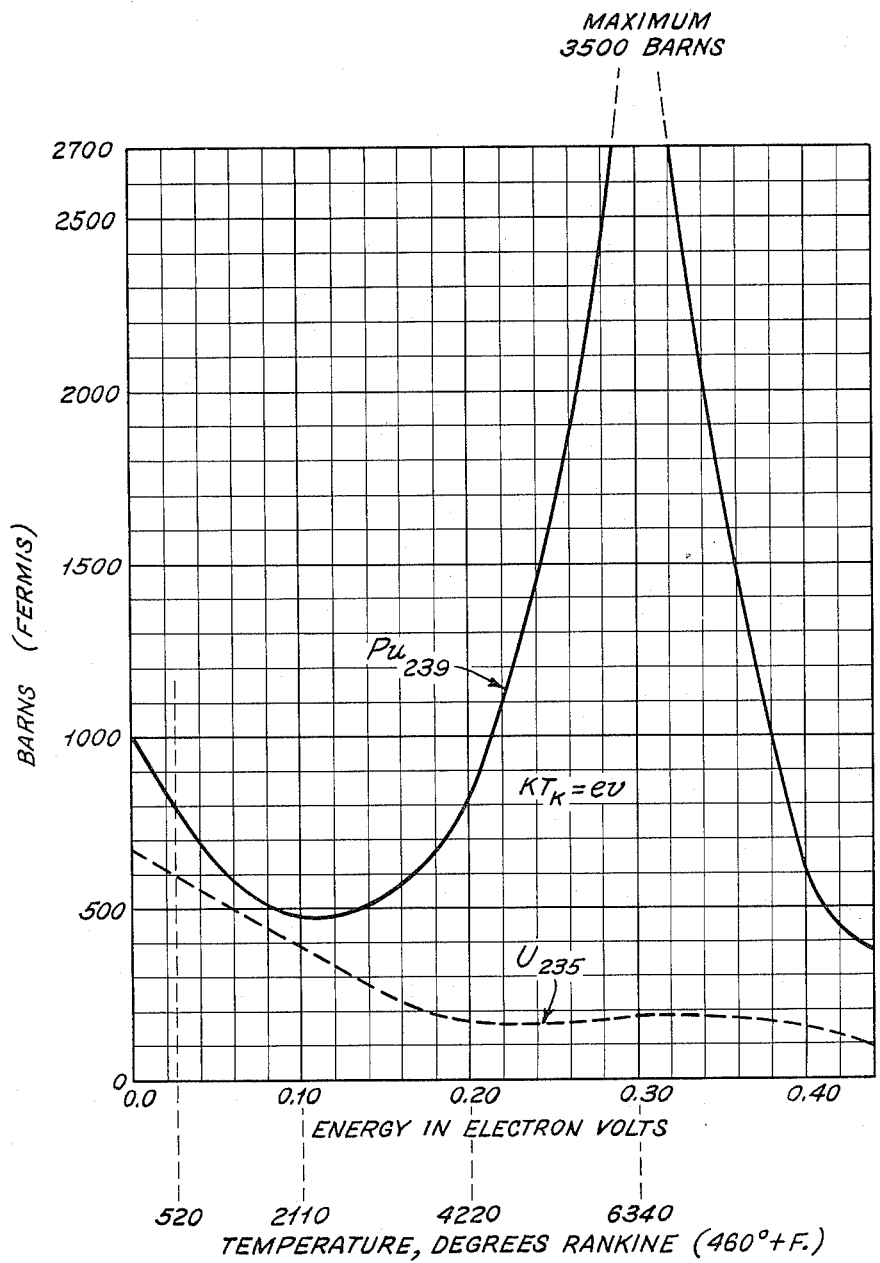

United States Patent Office 3,210,253
Patented Oct. 5, 1965

3,210,253
SELF-LIMITING RADIANT NUCLEAR BOILER
AND SUPERHEATER
Morgan G. Huntington, Galesville, Md., assignor to
RNB Corporation, Salt Lake City, Utah
Filed Nov. 14, 1963, Ser. No. 325,204
17 Claims. (Cl. 176—18)

This application is a continuation-in-part of my prior applications Serial No. 776,465 filed November 26, 1958, for Radiant Nuclear Boiler, and Serial No. 837,246 filed August 31, 1959, for Method of Operating and Controlling a Nuclear Reactor, both said applications now abandoned.

This application relates to improvements in the art of nuclear reactors of the power generating type and particularly wherein a substantial amount of heat is transferred by radiation fuel to coolant; also the reactor is self-limiting, self-leveling, and capable of superheating the coolant, hence the title "Self-Limiting Radiant Nuclear Boiler and Superheater."

This invention concerns a graphite and light water moderated, light water cooled heterogeneous nuclear reactor for the generation of superheated steam. It is believed that the state of the art relative to heterogeneous graphite and light water dual moderated nuclear power reactors is sufficiently advanced that basic physics and specific calculations need not be included herein. Reference may be had to many issued patents and publications in the prior art on this subject.

All currently known heterogeneous nuclear power reactors are loaded with a fertile and fissionable fuel in a predetermined molecular ratio to a moderator. Control of such heterogeneous reactors can be accomplished by the addition or removal of fuel, moderator or reflector. In practice, however, control of reactivity is accomplished by the insertion or withdrawal of thermal neutron absorbers such as control and shim rods, and the inclusion of burnable neutron poisons.

Another way of controlling nuclear reactors is to control the ratio of fast neutrons to thermal neutrons. This is accomplished in boiling water reactors by modifying the level of water in the reactor, thus changing the amount of moderator present in the system.

A further way of modifying or changing the moderation ratio, which was disclosed for the first time in my application Serial No. 837,246, is to actually vary the lateral cross sectional area of the moderator in each unit cell. In this way the conversion of fast neutrons into thermal neutrons is governed and the rate at which power is generated is also controlled.

A principal objective of this invention is to reduce the hazard inherent in nuclear reactors through a natural limitation of the duration of excess reactivity (K–1) by means of a feedback or follow-up action which reduces the amount of the moderator present in the system when the excess reactivity is sustained over a certain interval in any unit cell.

The power nuclear reactors which use the neutron absorbers such as movable poison shim rods to reduce the thermal neutron flux density are wasteful of neutrons and this seriously reduces the overall thermal efficiency of the system. Therefore, it is another object of this invention to control the reactor by changing the physical cross sectional area of the moderator in each reactor cell thereby eliminating the conventional poison shim rods which reduce thermal neutron flux density except for safety rods on start up and for emergency scram shut down.

A further feature of this invention is that no excess reactivity can exist and criticality cannot be reached until the reactor moderation is completed by the injection of a sufficient amount of water into each unit reactor cell, thus supplementing the insufficient moderation of the graphite per se.

It is an additional feature of this invention that the reactor can fail safe should a loss or reduction of the coolant occur.

The development of heterogeneous nuclear reactors for the generation of useful heat has been confined to the gas cooled, boiling water, pressurized water, liquid metal, fused salt and other liquid cooled types. The known power reactors are hazardous due to the possibility of an explosive nuclear excursion, an explosion from water-metal reaction, or an explosion resulting from the failure of a pressure core vessel, from rupture of the pressurized shroud of the gas cooled reactors, or from entrainment of fission products and fuel in the circulating coolant.

Most of the known reactor concepts require that the fluid coolant bath the thinly clad nuclear fuel elements and any failure of the fuel element cladding permits dangerous entrainment of the fuel and fission products within the circulating coolant. This fuel cladding failure may easily occur during any sudden power excursion due to melting or rupture occurring at a phase change in the fuel, or the inevitable cladding destruction which occurs ultimately as a result of the direct exposure to high energy nuclear radiation.

It is therefore an object of this invention to provide a reactor in which there is no possibility of fuel element "failure" in the sense that the fuel and/or fission products can be entrained in the reactor coolant or otherwise contaminate the operating circuits and wherein no circulating fluid coolant bathes the fuel or its immediate container.

It has been previously considered necessary to bathe the nuclear fuel elements in the coolant in order to obtain adequate heat transfer rate as the fuel element's cladding could not be allowed to exceed a predetermined relatively low temperature, e.g., 300° F. for aluminum cladding. It was previously thought that providing coolant flow through the moderator alone could not provide sufficient cooling for high power reactors. However, by operating the nuclear fuel elements in the range of 3000° F. to 6600° F. and allowing the heat to transfer therefrom by radiation to a graphite moderator operating between 2500° F. and 4000° F., sufficient heat can be transferred to coolant tubes within the moderator to provide high pressure superheated steam which can be directly expanded in conventional steam turbines. Therefore, another object of this invention is to provide a power reactor capable of furnishing high pressure uncontaminated super-heated steam principally by radiant heat transfer between fuel element and moderator and between moderator and coolant in coolant tubes.

Coolant tube construction allowing part of the water to flash to steam effectively cooling the reactor constitutes one of the novel concepts of this invention. Some of these coolant tubes are formed of two concentric tubes permitting the insertion of neutron-absorbing safety rods within the inner tubes and the annular space between the two concentric tubes has a helical baffle. Other coolant tubes have only a helical baffle therein. A metered amount of water is injected into one end of the coolant tube, part of which is allowed to flash to steam while being thrown against the hot tube walls by centrifugal force while passing through the evaporator tube diverted by the helical baffle. The inner concentric tube within the evaporator tube is utilized for safety rod shut down purposes and for the insertion of nuclear instruments and devices. Neutron-absorbing rods may be mechanically moved within the inner tube and separate cooling devices for such shut down rods need not be provided because the temperature would be little greater than the maximum temperature of the coolant leaving the reactor and would in any case be below the metallurgical limit of the rod itself because the rods are surrounded by helium which acts as a thermal conductor.

The electric power generating capacity in the world appears to be doubling about every 15 to 20 years. At this rate, all of the economically useful fossil fuels (coal, oil and gas) could be practically exhausted within the next 100 years. However, the presently known reserves of uranium ore would be sufficient to furnish the projected world power demand for at least 2,000 years, provided that the theoretical conversion of uranium to energy could be more reasonably approached. That is, if the present one to three-tenths of one percent uranium utilization were boosted to a possible total atomic conversion to energy of 30 to 60 percent of the initial uranium, at least 20 centuries of ample electric energy could be assured. However, employing the boiling water and pressurized water reactors which are presently known and being manufactured, the maximum amount of energy that can be realized from uranium fuel is surprisingly small and actually is insignificant in relation to our fossil fuel energy reserves. With the presently developed reactor technology, our total known reserves of recoverable uranium constitute an equivalent of about one percent of our known fossil fuel reserves.

It is an object of this invention to increase the conversion of uranium to energy to reasonably approach that theoretically possible and thereby utilize uranium much more efficiently than what is presently being done.

It is a further object of this invention to provide a reactor with a critical array at atmospheric pressure, thereby eliminating the constant hazard from explosion and broadcast of radioactive materials from the usual, high pressure reactor core vessel.

It is an additional but most important object of this invention to provide, in the nuclear reactor art, a method of amplifying the interaction fast effect in order to maximize the direct high energy fission of uranium 238, even though the fuel elements are of the dispersed type as disclosed in prior Patent No. 3,028,330.

It is present practice to construct a graphite moderator for a solid fuel reactor of a plurality of interlocked blocks. These blocks are assembled such that holes therein are aligned for inserting both fuel and coolant tubes. When the moderator assembly of a plurality of blocks is in operation and subjected to the heat generated therein, uncontrolled expansion will cause the two penetrations therethrough to weave or "snake" in sharp curves. One possible reason for this is because the moderator is supported on only one side and can expand in all other directions. It is an object of this invention to provide a graphite moderator constructed of a plurality of loose blocks stacked together having coolant and fuel penetrations therein, which moderator is supported on three sides thereof such that each set of penetrations is parallel to two of the three supporting sides. As the result of such support all penetrations will remain essentially smooth continuous curves both during expansion and contraction resulting from changes in temperature of the moderator. Because the slopes of the three restrained sides of the graphite prism are greater than 40°, which exceeds the angular repose of graphite-upon-graphite, the entire assembly may be tilted as much as 40° from its original vertical axis in any direction without disrupting the alignment of the penetrations through the graphite. Therefore the reactor assembly may be considered an earthquake-resistant structure.

Another object of this invention is to provide a reactor which is so conveniently fueled that it is never necessary to load to high initial levels of reactivity and to compensate for such dangerous excess reactivity by inserting burnable poisons or resorting to other expedients which are wasteful of neutrons.

An additional object of this invention is to provide a reactor with means for flattening the neutron flux in any portion of the reactor core and especially to eliminate the present instability of large graphite moderated reactors due to the oscillation set up by transient neutron poisons which are principally due to the changing concentrations of xenon in different sections of the same reactor.

A further object of this invention is to provide for continuous separation and removal of fission products from nuclear fuels during burn-up by nuclear fission and includes the separation and removal of fission products from molten nuclear fuels before decay has produced significant amounts of such neutron poisons as xenon 135 and samarium 149.

The purposes of this continuous removal of fission products from molten nuclear fuels while under irradiation and during burn-up within the reactor may be described as follows: To eliminate the loss of reactivity due to the equilibrium build-up of reactor poisons; to eliminate high reactor poisoning following shutdown due largely to the beta decay of iodine 135 to xenon 135; to reduce a substantial loss of neutrons presently common to all reactors and thereby enhance the reproduction ratio. That is, to increase the relative amount of fissile material produced from fertile uranium 238 and thorium 232. To provide valuable by-products in that the ratioactive materials removed from the fuel-enveloping inert gas may also be used for various purposes. To increase the fuel burn-up and greatly lengthen the total fuel irradiation time and thus minimize fuel reprocessing time and costs.

Other objects and advantages of this invention will become apparent from the following detailed description and claims taken in connection with the accompanying drawings which disclose, by way of example, the principles of this invention and the best mode which has been contemplated for the application of these principles.

In the drawings:

FIGURE 2 is a top plan view of the reactor core and associated shielding showing fuel and coolant passages therethrough;

FIGURE 3 is a schematic elevational view illustrating the fuel feeding apparatus of this invention;

FIGURE 4 is a schematic sectional view taken through the reactor core and associated shielding;

FIGURE 5 is a perspective view of one form of a graphite moderator block utilized in this invention;

FIGURE 6 is a perspective view illustrating the expansion of a cube when supported on only one face;

FIGURE 7 is a perspective view illustrating the expansion of a cube constructed of a plurality of moderator blocks supported or restrained on three faces;

FIGURE 8 is an elevational view, partially in section, showing one form of coolant tube having a control rod therein;

FIGURE 9 is a sectional elevational view of another form of coolant tube having no control rod therein;

FIGURE 10 is a sectional view taken along line 10—10 of FIGURE 8;

FIGURE 11 is a sectional view taken along line 11—11 of FIGURE 9;

FIGURE 12 is an elevational view showing a detail of a thermal shield for the coolant penetration face of the reactor;

FIGURE 13 is a fragmental elevational view showing a portion of a thermal shield for the fuel penetration faces of the reactor;

FIGURE 14 is a sectional view taken along line 14—14 of FIGURE 12;

FIGURE 15 is a sectional view taken along line 15—15 of FIGURE 13;

FIGURE 24 is a cross-sectional view through one of the coolant tubes schematically illustrating the film of water therein;

FIGURE 25 is a curve of the fuel/moderator ratio as a function of the critical reactor size;

Figure 1:
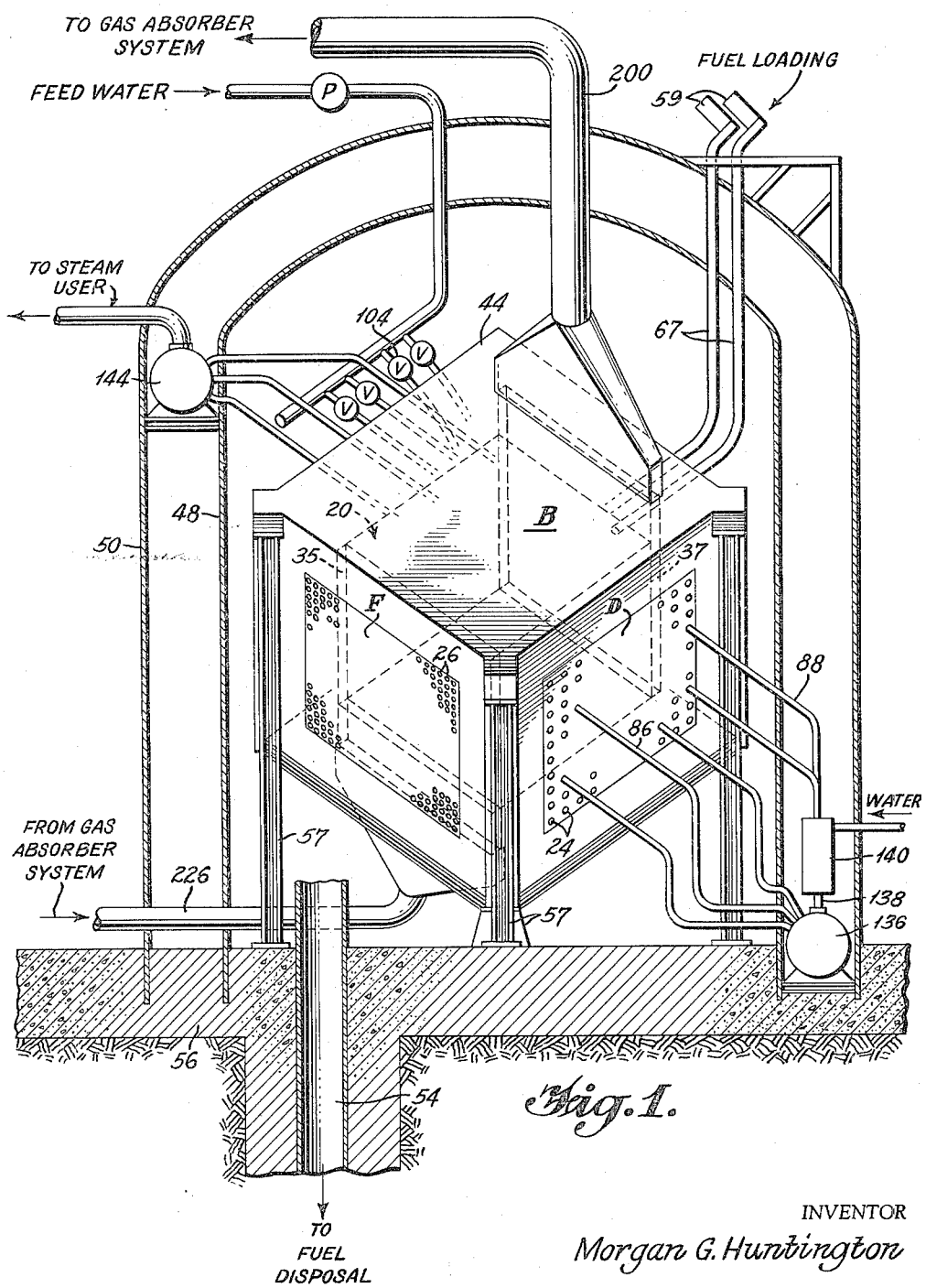
FIGURE 1 is a schematic elevational view of the reactor assembly and enclosing housing of this invention.
Figure 16:
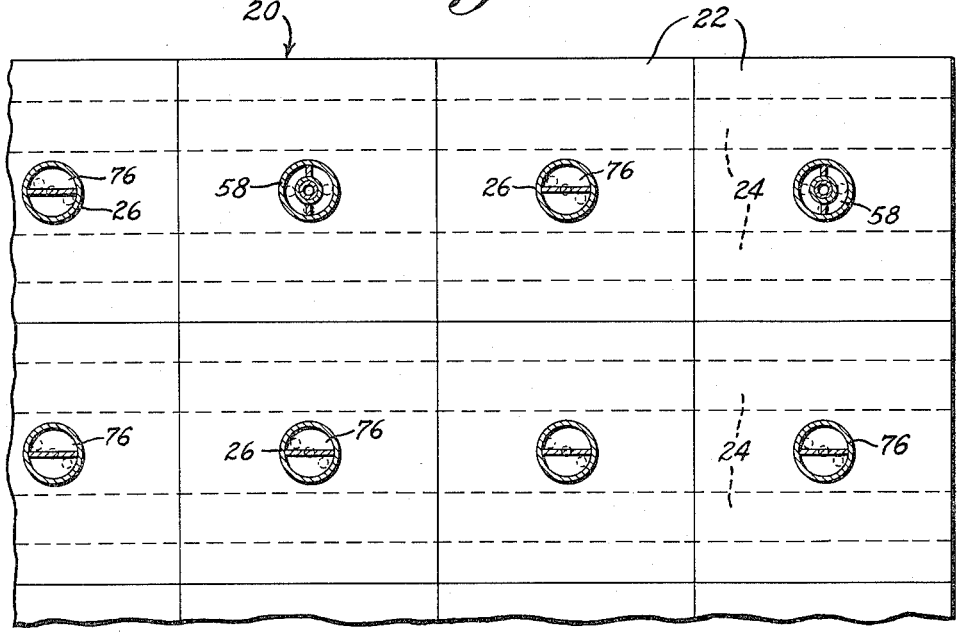
FIGURE 16 is an elevational view looking at a face of the reactor containing the coolant tubes.
Figure 17:
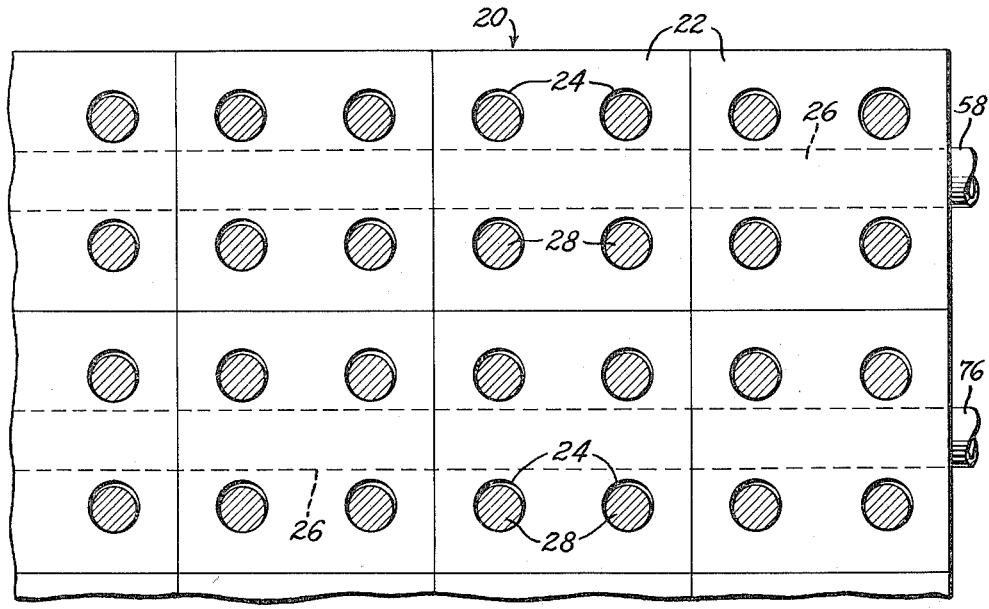
FIGURE 17 is an elevational view looking at a face of the reactor containing the fuel elements.

FIGURE 26 is a graphical illustration of the absorption cross section of U 235 and Pu 239 in barns or fermis as a function of temperature in degrees Rankine and energy in electron volts; and FIGURE 27 is a graphical illustration of the moderating ratio of reactors which are overmoderated and also those which are unmoderated with respect to graphite as a function of the amount of water in each unit coil which affects the total moderation or slowing down of neutrons.

Introduction

In general, this invention contemplates a graphite-water moderated uranium reactor having separate passages therein for fuel and coolant, which graphite pile operates at incandescence, i.e., above 3000° F. and the principal cooling is by thermal radiation to coolant tubes penetrating the reactor. The reactor is firmly supported on three of its six sides and the restraint of the graphite is by gravity because the inclination of each face of each graphite block in the pile exceeds the angle of repose of graphite-on-graphite. The fuel element and coolant tube penetrations are each parallel to two of the fixed faces of the graphite so that the thermal distortion is minimized. Shrinkage cracks between the graphite cannot occur since the gravity restraint acts along all three fixed faces of the graphite pile. The coolant tubes are of special construction for accomplishing the cooling by hot water partially flashing to steam. Some of the coolant tubes have a concentric tube therein which is not connected to the coolant system and the annular space between the inside of the coolant tube and the inner tube has a spiral baffle. Thus when water is injected into the annular space part will flash to steam at the high temperatures of the coolant tube and will be thrown by centrifugal force due to the helical baffles against the sides of the tube while passing therethrough, while concurrently separating the steam from water.

Each coolant tube and corresponding fuel passage may be considered an individual adjustable cell wherein the lateral cross-sectional area of water may be varied. By injecting an appropriate amount of water the reactor may become supercritical momentarily, that is, the $K_{eff}$ will become somewhat greater than 1. On becoming supercritical, the neutron flux will increase causing the heat generated to increase and the increased heat will be transmitted through the moderator to the coolant tubes to evaporate the excess water injected and to control the fuel/moderator ratio and effectively control the multiplication factor. Superheater tubes are provided in the reflector for furnishing steam at any temperature and pressure desired subject to the usual metallurgical limit of boiler tubes and the reactor may be shut down by safety rods driven inside the central tubes within the coolant tubes.

The neutron flux density within the pile may be also controlled by the varying injection of water to the coolant tubes through parallel injection nozzles and may thus be adjusted over a wide range. The fuel matrix is composed of a multitude of crucibles containing molten fissionable and fertile materials as disclosed in U.S. Patent No. 3,028,330, and the fuel elements are continuously swept by inert gas which entrains and removes fission products from the reactor as vapors and fumes. The removal and storage of these fission products which boil off below 4200° F. does not involve handling nor holding of radioactive liquids. These undesirable radioactive fission products are eliminated from the reactor fuel before decay to serious reactor poisons, thus improving the neutron economy and allowing much longer irradiation of fuel.

Reactor construction

The reactor is basically a graphite-uranium pile undermoderated with respect to graphite (having moderation completed by light water) and normally operating at extremely high temperatures such that heat will be transferred to coolant tubes penetrating the graphite moderator.

Figure 21:
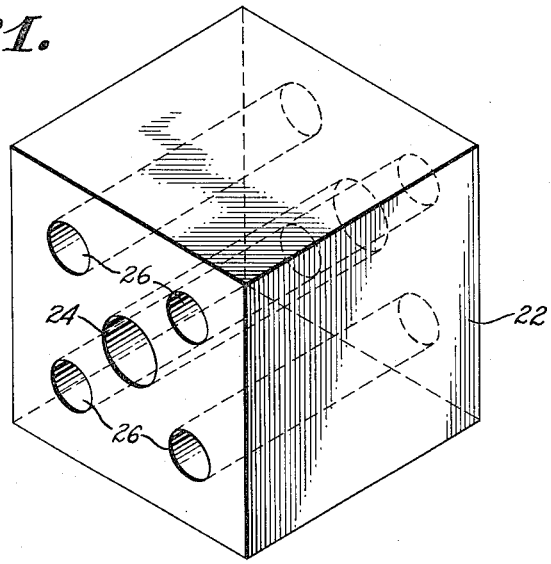
FIGURE 21 is a perspective view of an alternative form of moderator block wherein the fuel passages are parallel to the coolant passage.
Figure 22:
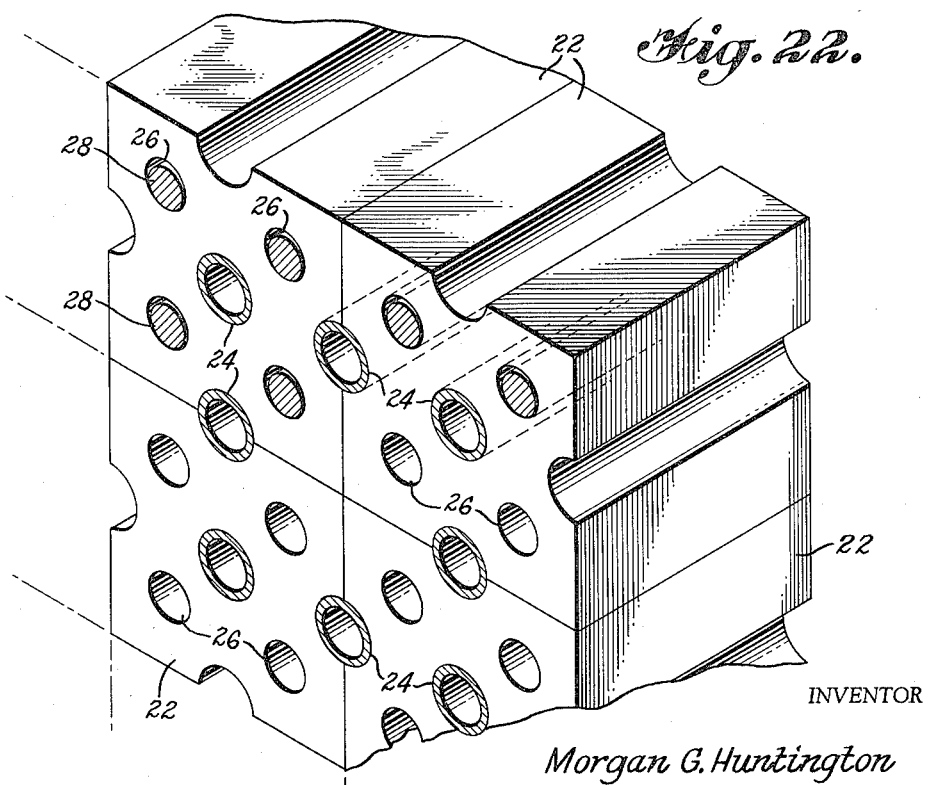
FIGURE 22 is a perspective view of another modification of a moderator block wherein there is a coolant tube for each fuel penetration.

Referring to the drawings, FIGURES 1, 2, 4 and 7, the graphite pile 20 is generally cube shaped or similar rectangular parallelopiped and is so constructed from a plurality of cube-shaped blocks 22. Each of the moderator blocks 22 has a coolant tube passage 24 as well as a plurality of fuel passages 26 therein. These passages may be through opposite faces of the cube as shown in FIGURE 5 or they may be parallel to the fuel passages, FIGURE 21. Also, in another embodiment of this invention using enriched fuel there may be one coolant tube penetration for each fuel penetration as shown in FIGURE 22. A plurality of fuel elements 28, FIGURE 3, may be inserted in the fuel passages 26 and these fuel elements are of such a nature that they may be operated as high as 6,600° F. without destruction of the fuel element matrix materials. A suitable fuel element which may be used is a nuclear material in an atmosphere of carbon monoxide or helium, and is contained in what are in effect crucibles of graphite, uranium carbide, thorium carbide, or thorium oxide in thorium oxide crucibles within graphite containers, or uranium carbide in depleted uranium carbide crucibles provide a thermally stable fuel element and permit such high operating temperatures, see Patent No. 3,028,330. Heat transfer is not such a serious critical problem at these high temperatures because transfer of heat by radiation is a function of the fourth power of the absolute temperature and the materials or spaces through which the heat is to be transferred when raised to such a high temperature cannot act as an insulator in the normal sense as in the case in conduction heat transfer.

It should be noted here that the only metal used in the reactor core is for the coolant tubes themselves since there is no metallic cladding on the fuel. Also there will be no samarium or xenon poisoning since fission products are continuously removed as described in detail hereinafter and therefore a very modest multiplication factor will be sufficient to operate the reactor. Further the critical array or reactor pile is not operated under substantial pressure thus eliminating a hazard of explosion and broadcast of radioactive materials.

Reactor shielding

The reactor shielding is best shown in FIGURES 1, 2 and 4. The reactor core 20 is constructed of a plurality of moderator blocks 22 having fuel passages 26 and coolant passages 24 therein and is surrounded on four of its six faces by a graphite reflector 30. The other two faces are shielded by a layer 32 of carbon blocks containing boron carbide since continuous feeding of the fuel causes the fuel to penetrate either side of the graphite core. Surrounding the reactor core on all six sides is a primary thermal shield 34, separated from the carbon by at least 18 inches of refractory insulating brick 35. The primary thermal shield 34 is cooled by coolant flowing through passages 36 therein. The construction of this shield will be described in detail hereinafter. On the outside of the primary thermal shield 34 is a second refractory layer 38 approximately 18 inches thick. Outside the refractory layer 38 is a secondary thermal shield 40 also having coolant passages 42 therein. The construction of shield 40 is similar to the construction of shield 34. A biological shield 44 of concrete suitably weighted surrounds the outside of the reactor and is generally the same shape making a total overall cube-shaped reactor and shielding construction. Outside the biological shield is an inert gas space 46, an inert gas shroud 48 and a containment shell 50, FIGURES 1 and 4.

The inert gas shroud 48 and the continuous shell 50 are suitably anchored in a heavy mass of concrete 56 such that no earthquake or the like could possibly destroy the reactor.

Gas passages 35 and 37 are provided at the edge of the reactor core 20 and are in fluid communication with the fuel passages 26 such that the fuel elements 28 may be swept with an inert gas to entrain the radioactive materials in vapor form which will subsequently be removed as described hereinafter.

*Reactor support*

In order to compensate for the thermal expansion which will occur at the extremely high temperatures involved within the reactor, the reactor is firmly supported on three of its six sides as shown in FIGURES 1 and 2. If a reactor is constructed of a plurality of blocks in the general shape of a block or cube as shown schematically in FIGURE 6 and is supported on one of these six faces of the block, upon expansion the block will expand in the direction of five of its six faces. If the block is made of a plurality of separate blocks, this expansion will cause any penetration or hole therein to assume a jagged curved pattern and this is detrimental to loading and unloading of fuel as well as to possible removal of the coolant tubes.

This invention solves this problem by supporting the reactor on three of its six faces such that the restraint of the graphite moderator blocks is by gravity because the attitude of each supported face exceeds the angle of repose of graphite on graphite. The moderator blocks are not interlocked in any way and they may freely slide relative to each other. Thus, they are restrained by gravity on three faces and may expand only in the directions of the other three faces. This restraint and expansion is shown schematically in FIGURE 7.

For convenience, the faces of the moderator pile will be designated A and B for the block faces, C and D for the coolant penetration faces, E for the fuel loading face, and F for the fuel discharge face. Thus, the fuel penetrations are through faces E and F and the coolant penetrations are through faces D and C. The restraint of two sides of the moderator is parallel to the penetrations, thus the fuel penetrations 26 are parallel to the restraining sides A and C and the expansion of the moderator blocks may be only in two directions transverse to the penetrations rather than in five separate directions as in the case of a conventionally supported pile illustrated schematically in FIGURE 6. In a similar manner, the coolant penetration through faces C and D are parallel to the restraining faces A and F of the cube and they may also expand only in the two directions transverse thereto. Hence, the penetrations for both coolant and fuel even after extreme expansion and contraction will assume only gradual continuous curves and will not "snake" as in the case of conventionally supported piles. Shrinkage cracks between the graphite blocks cannot occur since the graphite restraint acts along three fixed faces of the graphite pile.

It should be further noted that by so supporting and restraining the reactor asesmbly the entire reactor may be tilted as much as 40° in any direction without causing the individual graphite blocks to be dislocated by sliding one on the other. This manner of support and gravity restraint makes it possible for the loose aggregation of small graphite blocks to remain intact even in the event of extreme earthquake undulations of the earth's crust.

Suitable slab support members may be utilized to support the reactor core and its associated shielding on the three supported sides with a supported corner of the tube pointing downward. The drawing shows support members 57 in FIGURE 1, schematically illustrated for the sake of simplicity.

*Fuel feeding*

Apparatus for fuel feeding is schematically shown in FIGURE 3. The reactor core is between the biological shields 44—44 and the core and shields have fuel passages 26 therein for the passage of separate fuel elements 28 therethrough. Because of the angle at which the fuel elements are disposed within the core the elements 28 will tend to slide through the core and shielding by gravity in the area marked *a*. Suitable fuel passage outlet conduits 45 are in communication with the fuel passages in the shielding 46 at the fuel outlet face of the reactor. These conduits are bent toward the horizontal in the section marked *b* in FIGURE 3 such that the sliding of the fuel element 28 by gravity is stopped. A fuel disposal tube 54 is provided at the end of the fuel discharge conduit 45. A suitable vibrator 47 is linked to the conduit 45 for vibrating the same to cause the fuel elements 28 to move in the section *b* and individually drop down the tube 54.

Fuel feeding is controlled by three gate valves 51, 53 and 55 which are positioned in a fuel feeding conduit 67 in communication with the fuel passages 26 in the fuel feeding face of the reactor core. A suitable magazine 59 may be provided for automatically passing new fuel elements 28 into the fuel feeding passage. Valve 51 controls the feed of a new fuel element in the core section and valves 53 and 55 control the feed of a new fuel element to the ready position through the valves 51 and 53. It is necessary to use valve 55 to insure that valve 53 will be able to close and will not be stopped by a fuel element 28.

In operation, a plurality of fuel elements 28 may be loaded in magazine 29 and are automatically fed into tube 67. Valves 55 and 53 may be manipulated to discharge another fuel element into the ready position between valves 51 and 53. When it is desired to feed another fuel element 28 into the reactor core valve 51 is opened and the fuel element will slide into position by gravity forcing another fuel element out of the core. To dispose of the fuel elements, vibrator 47 is actuated vibrating section *b* of outlet conduit 45 shaking a fuel element 28 into discharge tube 54.

The amount of fertile and fissionable fuel in the fuel passages is chosen such that the reactor is undermoderated with respect to graphite alone. That is, the reactor is so loaded with enriched fuel that critically cannot be reached at operating temperature unless more water is injected into the evaporator tubes than can be evaporated by the heat within the reactor per unit time.

The fuel elements used may be those described in the Justheim-Huntington Patent No. 3,028,330 granted April 3, 1962.

*Coolant tubes*

The reactor fuel transfers heat to the graphite moderator which in turn also transfers its heat principally by thermal radiation to coolant tubes penetrating the pile but isolated from the fuel. These coolant tubes which extend through coolant penetrations 24 in the moderator blocks are shown in detail in FIGURES 8, 9, 10 and 11.

The coolant tubes shown in FIGURES 8 and 10 are adapted to have a safety rod positioned therein when shut down. Coolant tubes shown in FIGURES 9 and 11 are single tubes.

The safety rod coolant tube shown in FIGURES 8 and 10 consists of an outer tubular member 58 and an inner tubular member 60. These members extend through the moderator block and the inner member 60 may be closed at the bottom at 62 as illustrated. The outer tubular member has at least three coolant injection nozzles 64, 65 and 66 for injecting. Between the outer side of tube 60 and the inner side of tube 58 is positioned a helical baffle 68 for directing the coolant and causing it to throw itself by centrifugal force against the side walls of outer tube 58 and separating steam from the coolant. A safety shut down rod 70 of boron steel or other suitable material may be driven within the inner tube 62 and a gas cushioning arrangement is provided at the bottom end of inner tube 62 by the tapered shoulder 72 on the control rod. Thus, when the control rod is quickly inserted the gas cushion will prevent it from hitting the bottom of tube 62 hard enough to damage the tube. The coolant injected by nozzles 64, 65 and 66 will fling itself by centrifugal force against the side walls of tube 58 to form a controllable thickness film thereon and to rapidly absorb heat therefrom and will exit through the outlet portion 74 of the coolant tube into a suitable steam header or the like. Normally only nozzles 64 and 66 inject coolant and nozzle 65 is utilized for control purposes as described hereinafter.

The coolant tube shown in FIGURES 9 and 11 is similar to the coolant tubes shown in FIGURES 8 and 10 with the exception that it does not have the inner concentric tube for the scram safety rod 70. The tube does have an outer shell 76 containing a helical baffle 78. Coolant injectors 80, 81 and 82 are adapted to controllably inject coolant therein which is in a like manner thrown by centrifugal force to form a controllable thickness film against the surfaces of tube 76 while passing rapidly therethrough. An outlet conduit 84 is provided for the heat transfer fluid. Injector nozzles 80 and 82 supply the normal coolant and nozzle 81 is adapted to be used for control purposes.

The coolant injecting nozzles 80, 82, 64 and 66 are designed to control the injection of light water coolant-moderator to control the reactor as will be described hereinafter.

The physical construction of the superheater tubes and the evaporator tubes is the same and by suitable valving the tubes may be used interchangeably for either service. These tubes may be constructed as shown in FIGURES 8 through 11 and described above. As shown in FIGURES 1 and 4, the evaporator tubes 86 are generally in the center of the pile while the superheater tubes 88 are generally towards the edge of the pile.

Heat transfer

Figure 23:
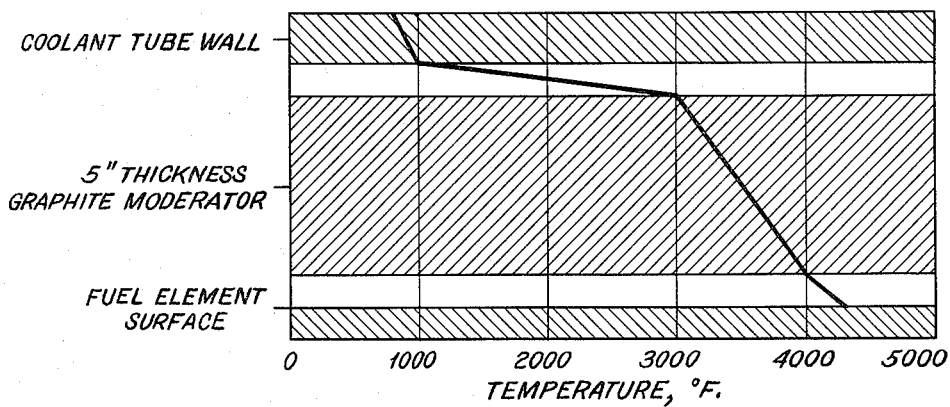
FIGURE 23 is a graphical illustration of the heat transfer from the surface of the fuel element to the coolant within the coolant tube.

In discussing the heat transfer system of this invention, a cube of graphite 16 inches on the side will be referred to as a "core unit." Each such cube may be penetrated by four fuel channels on eight inch centers and one coolant tube channel centrally placed in the block as shown in FIGURES 5 and 22. For simplicity of calculations, consider the four fuel penetrations to be parallel with the single control coolant tube penetration, which configuration is shown in FIGURE 22. FIGURE 23 also shows the unit block of graphite but in this embodiment of the invention there is one coolant tube for each fuel element penetration. The coolant tubes contain sufficient water to contribute to the moderation and therefore require enriched uranium for the reactor to operate. There is a measurable space between the outside of the coolant tube and the inside of the corresponding penetration in the core block. This space is filled with helium which makes a contribution to the heat transfer between the moderator and coolant tube.

The following is a description of the flow of heat from the fuel element to the coolant tube. For a single tube to remove the heat from four fuel elements while operating at the maximum heat flow, which probably is in the order of 200,000 B.t.u.'s per square foot of coolant tube surface, 50,000 B.t.u.'s an hour will be removed from each square foot of fuel element.

As has been explained before, heat is transferred from the fuel element to the graphite by thermal radiation, through the graphite by thermal conduction and from the internal surface of the fuel element penetration within the graphite to the coolant tube. As is well known, the radiation between the surfaces of solids separated by a non-absorbing medium is a function of the fourth power of the absolute temperature and is given by the equation that the heat transferred is equal to Stephan-Boltzmann's constant times the area times the entire quantity as follows: [The coefficient of emissivity of the emitter times the (temperature of the emitter over 100) to the fourth power minus the coefficient of absorptivity of the absorber times (the temperature of the absorber over 100) to the fourth power.] Expressed as an equation this is $$Q = 0.173 \times A \times \left[ \epsilon \left( \frac{T}{100} \right)^4 - \alpha \left( \frac{T}{100} \right)^4 \right] \frac{B.t.u.}{hr.}$$

The quantity of heat is expressed in B.t.u.'s per hour when Stephan-Boltzmann's constant is 0.173. By solving this equation it will be found that about 200,000 B.t.u.'s an hour can be transferred from graphite at a temperature of 3,000° to 3,500° Fahrenheit to coolant tubes at 800° to 1,000° Fahrenheit principally by radiation. The internal temperature of the coolant tube penetration within the graphite is therefore in the order of 3,000 to 3,500° Fahrenheit.

The general equation of thermal transfer through solids by steady conduction is given by the simple relation proposed by Fourier in 1822 and is $Q = U \times A \times t$ in which Q is in B.t.u. per hour per square foot per degree Fahrenheit per foot of thickness and the U is a coefficient of thermal transfer which may be taken as unity for silver and copper (about 220 B.t.u. per hour per square foot per degree Fahrenheit per foot of thickness) about one-ninth for carbon steel, about one-thirtieth for stainless steel, and about one-tenth for dense graphite brick at high temperature.

In the graphite block in FIGURE 22, the maximum temperature will occur on the side of the fuel element away from the coolant tube. The curved path length over which half of the heat must be conducted is about five inches. Since the internal temperature of the coolant tube penetration is necessarily in the order of 3,500° Fahrenheit, the maximum temperature within the carbon block may be arrived at by substituting in the equation $Q = U \times A \times \Delta t$ and solving by the temperature difference necessary to drive 25,000 B.t.u. per hour from the backside of each fuel element through the five inch curved path through the region of maximum heat flow at the area of constriction at the coolant tube penetration surface. The area for the equation is a function of one-eighth of the circumference of the coolant tube penetration. At full power load of 50,000 B.t.u. per linear foot of fuel element the maximum temperature differential within the graphite block will be about 1,200° Fahrenheit. Thus the interior surface of the fuel element penetrations will be at a temperature in the order of 4,200 to 4,700° Fahrenheit.

Again, solving the equation for thermal radiation between the surfaces of gray solids separated by a non-absorbing medium and using 4,500° Fahrenheit for the temperature of the absorber and assuming the ordered area of the fuel element to be one square foot per linear foot, in order to transfer 50,000 B.t.u.'s an hour it will be necessary that the fuel element surface temperature be in the order of only 300 or 400° Fahrenheit hotter than the graphite which it faces. It is interesting to note how the temperature differential decreases with rising temperature although the same amount of heat may be transmitted. For instance, in radiating from the graphite to the coolant tube a temperature differential of about 1,500° F. is necessary to transmit 200,000 B.t.u.'s an hour while at the higher temperature of the fuel element, 50,000 B.t.u.'s an hour can be transmitted with the temperature differential in the order of 300° Fahrenheit. The foregoing is graphically illustrated in FIGURE 23.

It is pointed out and emphasized that through the operating ranges of the reactor, the fuel elements consisting of uranium carbide clad in graphite will be above the melting point of uranium carbide and although the thermal output of the fuel element may change by several hundred percent, the temperature differential necessary to cause such change in thermal radiation is a matter of only 100° to 200° Fahrenheit. For instance, if the fuel element surface is 5,500° Rankine and the internal face of the fuel element penetration is at 5,000° Rankine the heat transferred would be in the order of 300,000 B.t.u.'s an hour while only 50,000 B.t.u.'s an hour is required at full load in this particular reactor configuration. Therefore, even though the fuel were operated at much higher temperature and the coolant penetrations were multiplied by 4 as is shown in FIGURE 23, the actual feul element temperature would change only in the order of 100 or 200° Fahrenheit even though the total thermal output might be multiplied by a factor of 4 or 5.

Figure 20:
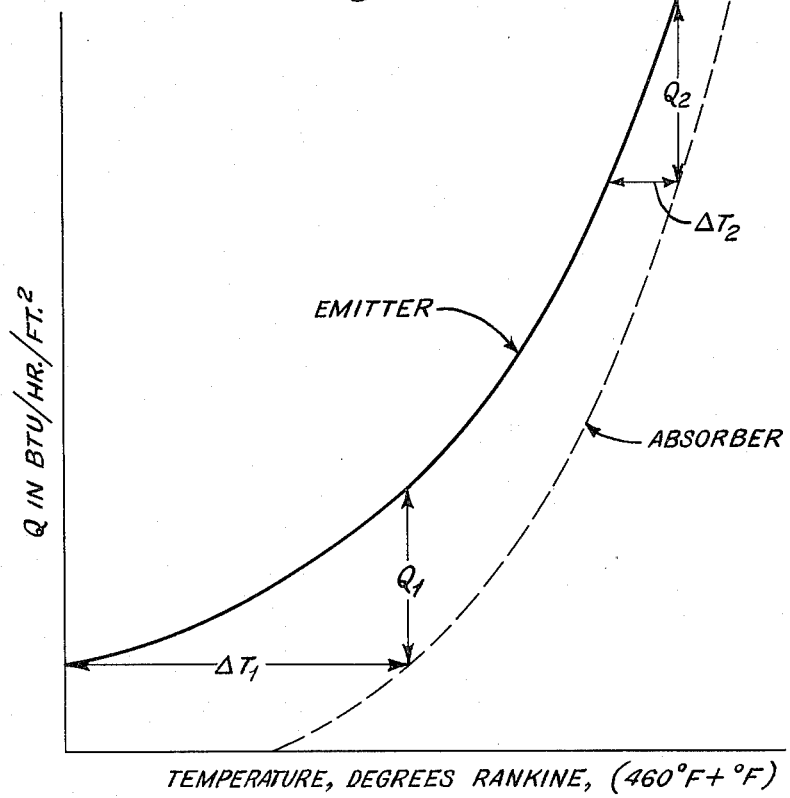
FIGURE 20 is a graphical curve illustrating the heat transfer effects by radiation utilized in this invention.

The thermal radiation heat transfer curve which is so important to this invention is plotted in FIGURE 20. As shown in FIGURE 20, $Q_1=Q_2$ but $\Delta T_1$ is over 4 times $\Delta T_2$ and $\Delta T_2$ decreases rapidly with increasing temperature. It is evident that a very large Q is radiated at very high temperatures but very small temperature differences, while at lower temperatures something like 1,000° F. is required as temperature difference between boiler tubes and furnace walls in transferring some modest 25,000 B.t.u.'s per square foot. While radiation is less per unit of temperature differential, conduction through the inert gas remains the same per unit of thickness of the gap.

Although the major heat transfer is by radiation, minor but substantial heat transfer is by conduction through the inert gas gaps, which are the non-hatched areas illustrated in FIGURE 23. Also, the specific figures given are for the sake of illustration only.

It is apparent that substantially all the heat transferred from the fuel to the coolant is through the graphite moderator. Hence, the moderator serves the functions of slowing down the neutrons, transferring and diffusing the heat generated by the fuel, and acting as a structural support.

Thermal shields

The thermal shields 36 and 40 are shown in FIGURES 12 through 15, inclusive. Of course, the shields for the fuel faces and for the coolant tube faces must be different from the shields for the faces which have no penetrations and different from each other. FIGURES 12 and 14 show the thermal shields for the coolant faces C and D of the core 20 where the coolant tubes are more widely spaced, and FIGURES 13 and 15 show the thermal shields for the fuel penetration faces E and F.

The thermal shields for both faces are similarly constructed, except for the differences in dimension and position, hence they will be described together. The thermal shields are constructed of a cast material as a base 90 and have tongue and groove joints 92 and 94, respectively, on each side thereof. Each block is provided with suitable penetrations 96 aligned with a fuel or a coolant penetration. The thermal shields are cooled by coolant in fluid passages therein. These passages may be cast in a block and connected by outside connectors 98 from one block to another as shown in FIGURES 12 and 13.

In order to provide for thermal expansion which will occur at the high temperature involved within the core, suitable expanders 100 and 102 are provided within each of the tongue and groove joints. These expanders may be merely expandable fluid filled tubes at the bottom of each tongue and groove joint. The fluid expanders 100 and 102 extend not only vertically but also horizontally and the tongue and groove joints are also vertical and horizontal. This arrangement is also shown in FIGURES 12 and 13. The expanders must also of course be offset laterally with respect to each other and the vertical fluid expanders 100 are offset from the horizontal fluid expanders 102 as shown, for example, in FIGURES 14 and 15.

Gas adsorption and cleaning system

The removal of all fission products which do not form stable carbides and/or which boil below the melting point of uranium carbide (about 4,200° F.) is accomplished as follows:

The fuel element, in order to transfer a significant amount of heat to the coolant tubes, should have a surface temperature in the order of 4,000° F. and perhaps as high as 4,500° F. under full load. The internal temperature of the fuel is therefore always above the melting point of uranium carbide but remains well below its boiling point which is about 7,000° F. Such low boiling point elements as tellurium 135 which decays into iodine 135, which in turn decays into the serious reactor poison xenon 135 are eliminated from the molten fuel element as fast as they are formed by the fissioning of uranium 235.

Figure 19:
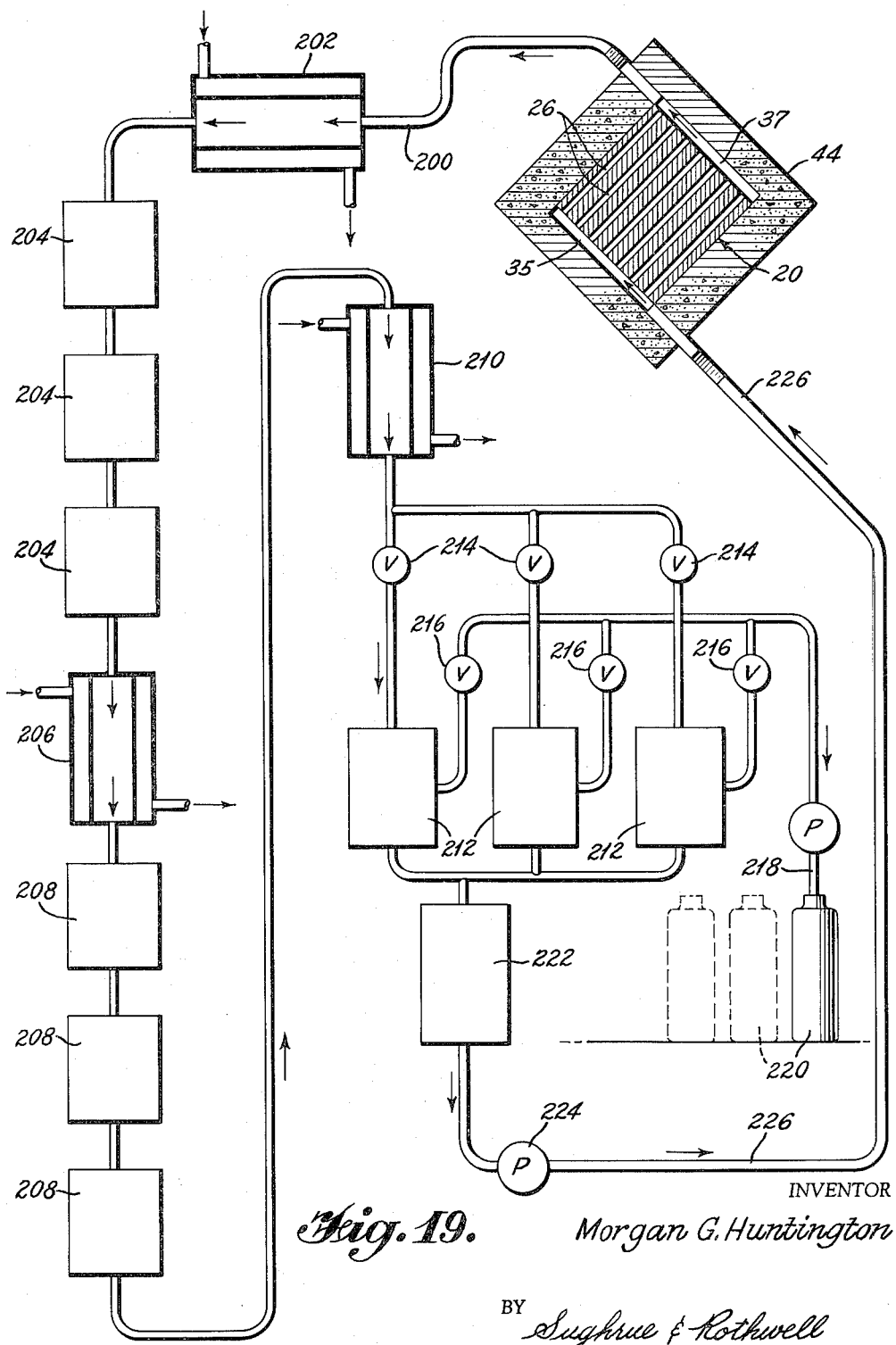
FIGURE 19 is a schematic illustration of the gas absorption circuit utilized to absorb the radioactive neutron poisons which boil off the fuel elements in the operation of the reactor.

Referring to FIGURE 19, as the fuel elements 28 in fuel passages 26 are continuously swept by helium gas, the volatiles are conveyed out of the reactor core through passages 37 and conduit 200 into cooling vessels or heat exchangers 202 where the condensables form impalpable fume. The helium entrained condensed fumes and noncondensable gas is further cooled and passed through a series of tubular electric precipitators 204 wherein a high voltage field is applied to fix the dispersoids against the internal walls of the tubes. The fact that each of these tubular precipitators has an efficiency above 99 percent and that there are three or more in series insures the satisfactory removal of radioactive materials which form dispersoids. The helium gas which still contains some radioactive dispersoids is further cooled by heat exchanger 206 and the dispersoids in the lower temperature gas are precipitated by another series of electric precipitators 208. The gas is then further cooled by heat exchanger 210 and this gas which contains radioactive iodine is passed through packed adsorber towers 212 of unglazed ceramic shapes impregnated with silver nitrate. Such packed adsorber towers insure the satisfactory control of radioactive iodine. Periodically the silver nitrate towers 212 in parallel are cut off from the stream by actuating suitable valves 214 and 216 and iodine 135 is allowed to decay and is removed as it becomes a gas by this beta decay to xenon 135. This gas in turn is led by conduit 218 through an adsorbent in container 220 which may be suitably eliminated. The relatively "clean" helium gas is thus passed to a storage chamber 222 from which it may be pumped back into the reactor core 20 by pump 224 through conduit 226. The entire adsorber system should be suitably shielded for beta and gamma radiation.

It is important to note that no liquids are employed in the removal of fission products. The solids which collect upon the tubular negative electrodes of the electric precipitators may be removed by metallurgical processing by the removal and melting down of the entire precipitator tube. Following the separation of desirable fission products and perhaps some plutonium, the slag, which of course is highly radioactive, is cast into molds of suitable size and these blocks are then cast within pigs of cast iron wherein they may be allowed to decay harmlessly and use may be made of the heat during a decay period. Certain of the radoactive fission products will have value such as strontium 90 and cesium 134, each of which have half lives in the order of 30 years and could conceivably furnish heat for a century when encased in cast iron. The fission products may be encased in two or more shells of cast iron to eliminate the possibility of cracking and exposure to the atmosphere.

Steam power and control system

Figure 18:
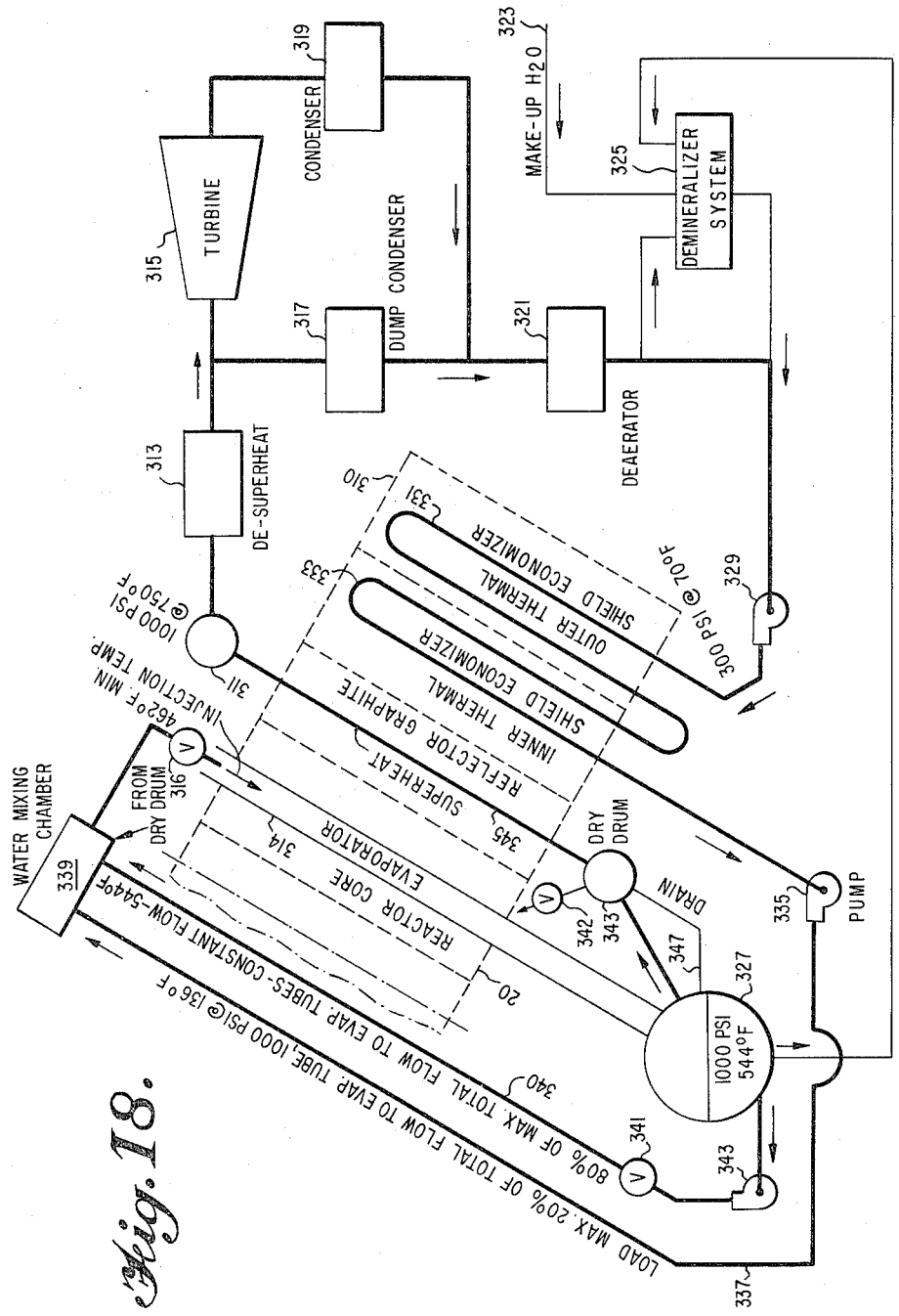
FIGURE 18 is a schematic diagram showing the overall reactor system and steam system for power generation.

Referring to FIGURE 18, a reactor as shown and described above includes a graphite moderator 310 which is loaded with a fissionable and fertile fuel in fuel passages (not shown in FIGURE 18). The reactor is provided with separate coolant passages such as evaporator tube passage 314 and the fuel and coolant passages are symmetrically positioned, the fuel being on a lattice arrangement as is well known in the nuclear reactor art. The details of the fuel and coolant passages as well as the reactor support have been described above.

The amount of fuel loaded in the fuel passages is chosen such that the reactor is undermoderated with respect to graphite alone, that is, the reactor is so loaded with enriched fuel that criticality cannot be reached at operating temperature unless more water is injected into the evaporator tubes 314 than can be evaporated by the heat within the reactor.

As shown in FIGURE 18 the entire system, in addition to the reactor core 20, includes a superheated steam header or drum 311, a de-superheater 313 from whence steam may pass to a turbine 315 or it may be used for other known purposes. Some of the steam may be selectively by-passed around the turbine 315 through a dump condenser 317. The exhaust of the turbine is condensed in condenser 319. The condensate of condensers 317 and 319 may be recycled for use in the system and in the course of recycle passes through a de-aerator 321. Make-up water may be introduced through line 323 into a de-mineralizer system 325 and some of the output of de-aerator 321 as well as output from a lower drum 327 may likewise be passed through the de-mineralizer system 325. A suitable pump 329 pumps the feed water into the outer thermal shield economizer illustrated in FIGURE 18 as 331 and then into the inner thermal shield economizer 333 from whence it passes to pump 335 and then is directed through line 337 to a water mixing chamber 339. The water passing to the water mixing chamber will have been heated by the economizer but in certain instances may be comparatively cool as compared to steam saturation temperature at operating pressure. This load feed water is mixed in the water mixing chamber with water from line 340 under control of value 341 pumped by pump 343 at the water system pressure and saturation temperature from the bottom of drum 327. The water flow through line 340 is constant in spite of load and is used for moderation purposes to complete the moderation while the water flow provided through line 337 constitutes the load flow. Therefore the temperature of injection at valve 316 constituting the mixed water will vary depending on the load. However, at ordinary load the temperature will be fairly close to the steam saturation temperature so as to not impose undue thermal shock on the reactor. Although at full load there may be a difference in temperature of the water injected, as compared to ordinary load, this is preferably compensated by bleeding saturated steam from a dry drum 343, under control of valve 342, and putting it in the mixing chamber 339 to further cut down the possibility of thermal shock by providing the water for injection at substantially saturation temperature.

The water injected at nearly saturation temperature forms a film on the inside of evaporator tube 314 and partially flashes to steam to accomplish cooling when evaporating. Thus, the load water flashes to steam and the entire contents of evaporator tube pass downwardly through the moderator 20 contributing to the moderation before passing into drum 327. Therefore, as shown, drum 327 contains water in its bottom portion which is recycled through line 340 and some which is passed through de-mineralizer system 325. Steam at saturation temperature is in the upper portion of drum 327. This steam is taken off and passed to dry drum 343 and then upwardly through a superheater tube illustrated graphically at 345 in the reflector graphite. The superheated steam then passes to superheater header 311 for use as described above. The dry drum 343 may be provided with a drain 347 leading back into the drum 327.

The water is injected by injecting means 316 into each evaporator coolant tube 314. Because of the helical baffles in the coolant tube such as described above, the coolant, which is light water, will be held against the walls of the tubes by centrifugal force. The central portion of the tubes 314 may contain suitable control rods or instruments as described above.

The amount of water injected from the mixing chamber 339 is much more than can be evaporated at full load and contributes enough moderation to bring the reactor up to a steady state condition, i.e., to a condition in which the multiplication factor is unity.

Each coolant tube 314 and corresponding fuel passage may be considered an adjustable cell wherein the lateral cross sectional area of water may be varied.

By injecting an appropriate amount of water from line 337 in addition to the water injected by the constant flow line 339, the reactor will become supercritical momentarily. That is, the $K_{eff}$ will be somewhat greater than 1. On becoming supercritical the neutron flux will increase causing the heat generated to increase and the increased heat will be transmitted through the moderator 20 to the coolant tubes 314 to evaporate the excess water injected from the load header and to control the fuel/moderator ratio and the effective multiplication constant.

Rate of change instruments as are known in the art can be also utilized to control the thickness of the water film.

The variable flow from the load line 37 thus controls the amount of steam which will be generated and controls the moderating ratio by controlling the lateral cross sectional area of moderator. The speed of response is adequately rapid. That is, the additional heat supplied as the thermal neutron density increases will travel through the thickness of the graphite moderator 20 to the cooling tubes 314. Thermal radiation which jumps the gaps between fuel and moderator and between moderator and coolant tube travels at the speed of light. The speed of response will approximate the speed of light plus the time for raising the graphite to a new temperature. It will not take much time to raise the graphite to a higher temperature at the temperatures involved because of the exponential curve for heat transmission by thermal radiation across the gaps. In other words, the speed of response from the time the load water film from the load line 337 changes the reactivity ($K_{eff}-1$) to .001. This makes a period of 30 to 40 seconds. The excess reactivity disappears as the increased flow of heat evaporates the additional water from the walls of the coolant tubes. The excess reactivity may be varied step by step. Of course, if in a specific construction the reactor period is less than the speed of response, differential type controls will be needed.

General operation

The operation of the system is such that there can never be any excess reactivity except what is supplied momentarily by the load line and this excess will be automatically reduced by the evaporation of excess water due to a rise in the neutron flux and corresponding rise in heat quickly transmitted. The principle of operation can be seen from the graph of reactor critical size as a function of fuel to graphite ratio or lattice spacing shown in FIGURE 25. It may be seen that the two curves represent a dry or gas cooled reactor and a wet reactor, i.e., a reactor with water coolant. The curve shows that the effective size reactor is somewhat larger if the reactor contains water. That is, the "dry" curve has a higher peak value than the "wet" curve. At a predetermined point, termed a "crossover point" the "dry" and "wet" curves cross. When operating on the right side of the crossover point as shown in FIGURE 25 the addition of water to the reactor for a given size lattice will raise the minimum size of the reactor, i.e., effectively lower the reactivity with the same size reactor. However, on the left side of the crossover point the addition of water to a dry reactor of a given lattice will lower the minimum size reactor or effectively raise the multiplication factor. The reactor of this invention is designed to operate to the left of cross point on the buckling curve of FIGURE 25.

The differences between conventional reactors which are over moderated with respect to graphite and the reactor of this invention which is undermoderated with respect to graphite may be further seen from FIGURE 27 which is a curve of the multiplication factor as a function of the water to graphite ratio in the moderator or the amount of water which will contribute to moderation. The curve labelled "overmoderated with respect to carbon" shows a conventional reactor which is overmoderated with respect to carbon and in which the multiplication factor $k$ is slightly greater than 1, i.e., the reactor is heavily supercritical without neutron poison rods. This type of reactor is one which has a buckling and fuel moderator ratio to the right of the crossover point shown in FIGURE 25.

The addition of water to a reactor thus constructed will parasitically absorb the slow neutrons and will cause the multiplication factor to drop as more water is added. However, the other curve "undermoderated with respect to carbon" shows the variation in multiplication factor when the reactor is initially undermoderated with respect to graphite and relates to a reactor having the physical parameters to the left of the crossover point of FIGURE 25.

The small portion of this curve labelled $a$ is a portion wherein the reactor of this invention is designed to operate. That is, the multiplication factor is varied by varying the water to graphite ratio through heat control in response to automatic neutron flux control. In other words, the addition of more water, when operating in the portion of the curve $a$, will increase the multiplication factor above unity and cause the reactor to go supercritical. However, the supercritical reactor will cause the neutron flux to increase and the heat will increase, which heat will be rapidly transmitted to the coolant passages in the moderator thereby evaporating the additional water which was added and causing the water to graphite ratio to drop thus dropping the multiplication factor back slightly below unity or to unity. The amount of water indicated $c$ is supplied by the constant flow line 339 while the amount of water $b$ which continually varies is supplied by the load line 337.

The action of this water film may be seen from FIGURE 24 which is a section of an evaporator tube with the water film enlarged for the sake of explanation. A film of water, $Wcf$ is effectively supplied from the constant flow line 339 and will tend to cling to the walls of the coolant tube because of the helical baffles therein and the speed of flow of the water in the tube. This water corresponds to the amount of water $c$ illustrated in the graph of FIGURE 27 and may be 500% more water than can be evaporated at full load of the reactor. In addition to this water there is a small water film illustrated in FIGURE 24 as $Wl$, that is, the water film supplied from the load line 337. The film thickness momentarily contributed by $Wl$ is variable and the heat transmitted through the coolant tube wall will evaporate some of the water film which evaporation is equivalent in amount to the water supplied by $Wl$. Although FIGURE 24 shows two water films it would be evident that actually there will be only one film which will vary above the amount of water supplied by the constant moderation flow ($Wcf$).

It can be seen with reference to FIGURES 24 and 27 that the reactor is self-limiting. When the reactor supplies heat to the coolant tube walls it will evaporate a portion of the water film thereon and will reduce the multiplication factor. When additional steam is desired more water is supplied through line 337 to the coolant tube thus raising the multiplication factor, raising the neutron flux and increasing the heat transmitted. This increased heat will quickly evaporate the additional water supplied into steam and will cause the multiplication factor to drop. If more than the load water is gone from the reactor, the reactor is subcritical and undermoderated with respect to carbon and automatically will shut down.

The reactor employs safety rods which are neutron poisons only for emergency shut down, during start up, and for safety during certain fueling operations. However, in operation the fine control of the reactor is automatic by virtue of the thermally sensitive water film which is in part centrifugally held on the walls of the evaporator tubes. The thickness of this water film, i.e., lateral cross sectional area of each cell of the moderator, is controlled in such a manner that excess reactivity ($K_{eff}-1$) can never exceed an amount wherein the reactor period will not be safely controlled by the speed of response of the heat transferred by the thermal radiation through the graphite. In other words, sensing of thermal changes in the reactor will be reflected in the changes of the water film by evaporation within less than half the reactor period. Therefore, the reactor will always be safely under control of the automatic variation of the fuel/moderator ratio due to moderator (water) evaporation.

The reactor, as explained above, is constructed to operate with fuel temperatures which are extremely high compared to known reactors, i.e., around 5,000° F. The moderator temperature will be somewhat lower and will be in the range of 3,000° F. facing the coolant tubes to around 4,500° F. facing the fuel passages.

The reactor will operate with an average neutron energy between $1/10$ and $3/10$ electron volt corresponding roughly to the temperature of the graphite moderator. As shown in FIGURE 26, between these energies the fission cross section of plutonium has a sharp rise and encompasses its first resonance. However, beyond $3/10$ of an electron volt energy the 3500 barn node of the resonance is passed and the fission cross section decreases. Between $1/10$ and $3/10$ of an electron volt the probability of fissioning of plutonium is greatly increased because the fission cross section of Pu 236 is from 3 to 17 times the fission cross section of U 235. The known uranium-graphite reactors which contain appreciable amounts of plutonium must therefore operate well below an average neutron energy of $1/10$ electron volt, or else face the possibility of a run-away by uncontrolled fissioning of the accumulated plutonium should the moderator temperature inadvertently rise above about 2,000 degrees R.

Furthermore, varying the neutron energy range of the reactor can be accomplished to favor the direct high energy fission of uranium 238.

In this reactor the chances of run-away plutonium are nil as the reactor is designed to operate safely in the temperature range at which plutonium exhibits a resonance, and because of the relatively great probability of neutron capture by plutonium as compared to U 235, very little plutonium can accumulate in the reactor at the temperature and neutron energies of reactor operation, as the plutonium will be fissioned at a high rate during all operating conditions.

Thus, the net effect on reactor stability of the plutonium resonance at 3500 barns and $3/10$ electron volt is that this fearsome fuel actually provides inherent safety by its absorption cross section resonance exhibited in the operating range of the reactor.

Increased uranium utilization

Three multiple efficiency factors combine to limit the present conversion of uranium to electric energy to about one tenth of one percent of the total potential heat energy content.

The first of these limiting factors is a function of the possible atomic burnup between chemical and metallurgical reprocessings. Nuclear fuels conventionally require frequent reprocessing in order to remove the neutron absorbing products which interfere seriously with reactor operation, usually before so much as one-third of one percent total atomic burnup has been obtained.

Each reprocessing and refabricating of the nuclear reactor fuel elements of boiling and pressurized water system, entails a metallic loss sometimes ten times as great as the atomic burnup, so the actual use factor in such situations can hardly exceed ten percent.

However, if most of the fission products could be continuously removed and if the fuel cladding failure problem could be solved (both of which solutions are exemplified in this power reactor concept), the overall conversion of uranium to useful energy can be immediately improved in the order of 500 percent.

The second limiting factor is the proportion of fertile atoms converted to fissile atoms, per atom fissioned. This is usually referred to as the "conversion ratio" or more properly, the overall "regeneration ratio."

$$\text{Regeneration Ratio} = \frac{\text{Neutrons produced, minus neutrons absorbed in non-fertile material}}{\text{Neutrons absorbed in fissionable material}}$$

or more briefly:

Regeneration Ratio = The number of neutrons produced per fission *minus* One nutron which is required for a subsequent fission *minus* Whatever non-fission losses Where the regeneration ratio is less than unity as is the case in all light water moderated reactors, the ultimate utilization of the nuclear fuel is limited to the capability of the reactor system to convert fertile material (for instance, U-238 or Th-232, the only naturally occurring fertile materials) to fissionable fuel.

The ultimate utilization is the sum of the series $$rC + rC_2 + rC_3 + rC_4$$

which reaches the limit $$\frac{rC}{1-C}$$

where $(r)$ is the fraction of fissionable atoms originally in the nuclear fuel element and (C) is the conversion ratio.

The ultimate utilization of any nuclear fuel is the sum of the original fissile content plus the fraction of fertile material converted to fissionable fuel or, $$r + \frac{rC}{1-C} = \frac{r}{1-C}$$

Therefore, in a reactor fueled with natural uranium and having a regeneration ratio of, for example, 0.75 to one, the uranium would have an ultimate possible total atomic burnup of $$\frac{0.00712}{1-0.75} = 0.0284$$

or 2.84 percent of the total, initial uranium could be converted into heat plus whatever fast fission of U 238 can be effected, which constitutes a very important bonus.

The regeneration ratio can also be broadly expressed in another form in which the number of fertile atoms converted, per atom fissioned is:

$$\text{Number of converted atoms} = \frac{C}{1-C}$$

where C is the regeneration ratio.

Thus, if C is 0.75, $\frac{0.75}{1-0.75} = 3$ atoms of fertile material converted *and fissioned* per initial atom of fissionable material.

It should be pointed out here that there need not necessarily be a "breeding gain"; i.e., the regeneration ratio need not exceed unity. For example, a conversion ratio of 0.99 indicates the possibility of almost complete utilization:

$$\frac{0.99}{1-0.99} = 99 \text{ atoms of fertile material converted and fissioned per initial atom of fissionable material.}$$

The reactor of this invention has a high reactor regeneration ratio, approaching but less than unity, for the following reasons:

the high neutron energy and fuel element arrangement permits a high ratio of direct fission of U 238;

the control rods are not normally used for ordinary control and no neutrons are therefore absorbed by the rods in normal operation;

and the neutron poisons are continuously swept out of the reactor and disposed of.

The third limiting factor is a thermodynamic one which is inherent in all devices for converting heat into mechanical energy. In the cases of both the known boiling and pressurized water concepts, this efficiency factor might be as high as 25 percent. That is, perhaps one-fourth of the heat of nuclear fission can be turned into electric energy.

The thermal efficiency of this reactor is higher due to the higher temperature heat source and the ability to superheat the coolant.

In order to estimate the surprisingly small amount of electric energy which is producible from one short ton of uranium oxide ($U_3O_8$) by present power reactor technology, the following equation is offered as an example:

Each short ton of uranium metal contains about 6,200 grams of U 235 which is the only fissionable nuclear fuel occurring in nature.

Each gram of nuclear fuel, upon fission, releases $0.91 \times 24 \times 3413 \times 1000$, or 73.4 million B.t.u. of heat energy.

Heat energy is, in the case of light water reactors, about 25 percent efficient in generating electric power.

Then, one short ton of uranium oxide ($U_3O_8$) converted to electric power by the presently developed light water reactors, would generate approximately:

Grams of W 235/short ton

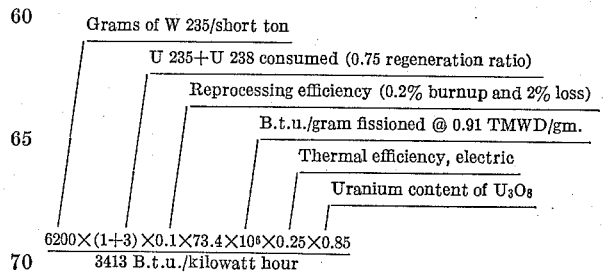

$$\frac{6200 \times (1+3) \times 0.1 \times 73.4 \times 10^6 \times 0.25 \times 0.85}{3413 \text{ B.t.u./kilowatt hour}}$$

or 11.74 million kilowatt hours of electric energy per short ton of initial uranium oxide.

An approximately 21.8 thermal megawatt hours of heat is generated for each gram of uranium fissioned, the efficiency of producing electric energy from nuclear fission by present light water technology is:

$$\frac{11.6 \times 10^6}{(0.91 \times 10^6) \times (21.8 \times 10^3) \times 0.85}$$

- Yield of EKWH per ton $U_3O_8$
- Uranium in $U_3O_8$
- Thermal kilowatts per gram fissioned
- Grams per short ton $11.6 \times 10^6 / 16.86 \times 10^9$ or $0.000689$—which is 0.07% efficient.

Thus, less than one-tenth of one percent of the total potential thermal energy of uranium is actually converted into mechanical energy employing known power reactor technology.

Compared on the basis of utilization of the total potential thermal energy, coal and oil are converted to electric energy some 400 times more efficiently than uranium.

However, the reactor of this invention greatly improves the efficiency of the overall conversion of the initial uranium to electric energy due to the combination of features discussed above.

Reactor stability and safety

Since the reactor is designed to produce power for commercial purposes, it is possible that a reactor of this nature will be located near centers of population. If, due to any credible accident the reactor were to explode, the radioactive material would be scattered widely over the countryside and the results would be catastrophic. Therefore, power reactors of necessity must be constructed in such a manner that hazard factors are kept to a minimum. All possible hazards are minimized in the construction of the reactor described above. Certain of the known power reactors unnecessarily jeopardize lives and property of the surrounding communities and reactors should provide for minimum potential hazards to the citizenry. Therefore, in addition to its promise to reduce the cost of electric power to the present commercial levels the radiant nuclear boiler invention incorporates the following inherent safeguards:

(1) Because fission products are continuously and separately removed by the gas absorber system, gaseous reactor poisons are not confined within the fuel and therefore do not pose a great threat of disaster common to all other heterogeneous reactors. That is, unlike any other heterogeneous reactor, it would be impossible for the reactor of this invention to suddenly lose a portion of the usual equilibrium xenon poisoning and instantly go prompt critical and beyond mechanical control.

(2) In this reactor the critical array (fuel and moderator) is not pressurized, hence there is no core vessel subject to explosive rupture as in the case with the boiling water, the pressurized water and the gas cooled types.

(3) No coolant bathes the critical array; therefore, chemical reactions between fuel and coolant are impossible.

(4) For this same reason as expressed in paragraph (3) above, entrainment within the coolant of fuel fission products and/or moderator is impossible and "fuel element failure" in the accepted sense cannot occur.

(5) The graphite core assembly of this reactor is gravity restrained and can withstand tilting of 40° in any direction without misalignment of penetrations. The reactor is not subject to destruction by severe earthquake shock and hence these reactors should be suitable for such areas as the Japanese islands.

(6) This reactor is safe in that a certain burst of power will decrease the moderator ratio by removing the excess water film and reduce the reactivity until the reactor is sub-critical and the chain reaction ceases.

(7) In this reactor the neutron energy spectrum is such that the deadly poison plutonium which fissions in preference to uranium 235 therefore cannot accumulate to the extent it does in lower temperature converters.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of operating and controlling a heterogeneous dual moderated graphite light water reactor comprising; loading the reactor with fertile and fissionable fuel on a lattice arrangement of the graphite moderator, the fuel to graphite ratio being such that the reactor is subcritical on graphite alone, introducing a film of light water onto the wall of coolant passages arranged within the lattice in the moderator, the coolant passages being separated from the fuel passages, and adjusting the thickness of the film of water on the wall of each individual coolant passage to control the reactivity of the reactor.

2. A method of operating and controlling a nuclear reactor as defined in claim 1 wherein excess reactivity is controlled by the heat provided within the reactor which in turn evaporates the light water film to a point wherein the reactor effective multiplication factor is automatically maintained at unity.

3. A method of operating and controlling a heterogeneous dual moderated graphite light water nuclear reactor comprising; loading the moderator with a fertile and fissionable fuel on a lattice arrangement therein, the lattice arrangement being such that the reactor's critical size will decrease for the same lattice spacing if the reactor is water cooled, introducing a film of water onto the wall of the coolant passages arranged within the lattice in the moderator, the coolant passages being separated from the fuel passages and individually adjusting the thickness of the water film to adjust the cross sectional area of water within each of the reactor passages in the moderator to thereby adjust the fuel to moderator ratio and the effective multiplication factor of the reactor.

4. A method of operating and controlling a heterogeneous graphite-light water moderated nuclear reactor as defined in claim 3 further comprising preheating the water coolant to be added to substantially saturation temperature at system pressure so that cooling will be accomplished substantially entirely by coolant evaporation and thermal shock within the reactor will be substantially eliminated.

5. A method of operating and controlling a heterogeneous dual moderated graphite-light water nuclear reactor by varying the fuel to moderator ratio, the method comprising; loading the reactor with fertile and fissionable fuel on a lattice therein chosen to operate to the side of the cross over point of the curve of FIGURE 25 such that the addition of water coolant to the reactor will raise the multiplication factor, holding a variable thickness flowing film of water onto the wall of the coolant passages within the moderator to control the lateral cross sectional area of water within each of the coolant passages and thereby controlling the fuel to moderator ratio and the multiplication factor of the reactor.

6. A method of operating and controlling a heterogeneous graphite-light water moderated reactor as defined in claim 5, further comprising maintaining the multiplication factor at unity by the generation of heat within the reactor by increasing the multiplication factor, the additional heat serving to evaporate the water film to lower the multiplication to unity.

7. A graphite-light water moderated heterogeneous nuclear reactor comprising; a graphite moderator having a plurality of fuel passages and a plurality of coolant passages therein, the coolant passages being completely separate from the fuel passages, a plurality of fissionable fuel elements disposed in a geometric pattern in said fuel passages in said moderator without completely filling said fuel passages, said fuel elements capable of operating at incandescent temperatures with the surfaces thereof above 3000° F., a coolant tube within each of the coolant passages in the graphite moderator, and means for providing a light water coolant-moderator in the form of a controllable thickness annular film held to the surface of the coolant tubes.

8. A nuclear reactor as defined in claim 7 wherein the graphite moderator comprises a plurality of separate moderator blocks assembled in a block-shaped pile such that said water and fuel passages are continuous therethrough, means for supporting three sides of said block-shaped pile composed of said moderator blocks such that one corner point of the block-shaped pile intermediate said three supported sides points downwardly and wherein the angle of inclination of each face of the so supported moderator blocks exceeds the angle of repose of graphite-on-graphite thereby providing gravity restraint for the so supported block-shaped moderator pile.

9. A nuclear reactor as defined in claim 7 further comprising means for passing an inert gas through said fuel passages and over said fuel elements in said moderator to entrain any undesirable fission products when in the vapor state, and gas absorption means for separating the reactive fission products which decay to serious poisons from said inert gas.

10. A reactor as defined in claim 9 wherein said gas absorption means comprises a plurality of electric precipitators arranged in series, heat exchange means, a plurality of silver nitrate gas iodine absorption towers, and gas conduit forming a closed circulation loop including the above recited elements and the pile.

11. A nuclear reactor as defined in claim 7 further comprising means for feeding fissionable fuel elements in short sections to the fuel passages in said supported moderator, the passages in the moderator being related to the moderator support such that the fuel will slide through the fuel passages by the action of gravity, conduit means at the outlet of the fuel passages formed to stop the movement of the fuel elements due to gravity, a disposal chute, and means external to said conduit for selectively moving said fuel elements on the conduit onto the disposal chute.

12. A nuclear reactor as defined in claim 7 wherein means are provided for individually controlling the amount of water injected in each coolant tube and for controlling the neutron flux density by means of the water film within the coolant tube.

13. A reactor as defined in claim 7 wherein at least some of said coolant tubes include a helical fin and an inner concentric tube therein and safety rods positioned within the inner tube for the purposes of reactor shut down.

14. A nuclear reactor as defined in claim 7 wherein at least some of the coolant tubes include a helical baffle therein to cause the water coolant-moderator to form the controllable thickness annular film and to assist in separating steam from the water.

15. A nuclear reactor as defined in claim 7 further comprising a plurality of expansible thermal shields positioned outside the graphite moderator, coolant passages in the thermal shields, and fluid comunication means between the coolant passages in the thermal shields and the coolant passages in the moderator.

16. A nuclear reactor as defined in claim 15 further comprising a tubular superheater positioned in a graphite reflector between the thermal shields and the graphite moderator, and fluid communication means connecting the inlet of the superheater to the coolant tubes in a manner to allow coolant evaporated to steam to pass to the superheater.

17. A nuclear reactor as defined in claim 16 further comprising a water mixing chamber having an outlet in fluid communication with said coolant tubes and having inlets in fluid communication with the coolant passages in the thermal shield and the outlets of the coolant tube.

References Cited by the Examiner

UNITED STATES PATENTS

| | | | |
|---|---|---|---|
| 2,769,780 | 11/56 | Clifford et al. | 252—301.1 |
| 2,982,711 | 5/61 | Rand | 176—31 |
| 3,012,385 | 12/61 | Hufft | 252—301.1 |
| 3,035,993 | 5/62 | Treshow | 176—20 |
| 3,056,736 | 10/62 | Went et al. | 176—37 |
| 3,068,162 | 12/62 | Roche | 176—84 |
| 3,090,742 | 5/63 | Fawcett | 176—20 |
| 3,102,089 | 8/63 | Mission et al. | 176—84 |
| 3,105,034 | 9/63 | Foglia | 176—31 |
| 3,115,450 | 12/63 | Schanz | 176—37 |

CARL D. QUARFORTH, *Primary Examiner.*